US008711236B2

(12) United States Patent
Shimizu

(10) Patent No.: US 8,711,236 B2
(45) Date of Patent: Apr. 29, 2014

(54) BLUR CORRECTION DEVICE AND IMAGING APPARATUS

(75) Inventor: Hironori Shimizu, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/571,598

(22) Filed: Aug. 10, 2012

(65) Prior Publication Data

US 2013/0088609 A1 Apr. 11, 2013

(30) Foreign Application Priority Data

Oct. 6, 2011 (JP) .................................. 2011-221690

(51) Int. Cl.
*H04N 5/228* (2006.01)
*G03B 17/00* (2006.01)

(52) U.S. Cl.
USPC ....................................... 348/208.99; 396/55

(58) Field of Classification Search
USPC ......................... 348/208.99–208.05; 396/55
See application file for complete search history.

(56) References Cited

U.S. PATENT DOCUMENTS

| | | | | |
|---|---|---|---|---|
| 6,064,827 A * | 5/2000 | Toyoda | ............................ | 396/55 |
| 7,502,554 B2 * | 3/2009 | Enomoto | ........................ | 396/55 |
| 7,689,107 B2 * | 3/2010 | Enomoto | ........................ | 396/53 |
| 8,111,295 B2 * | 2/2012 | Makimoto et al. | ........ | 348/208.99 |
| 8,208,031 B2 * | 6/2012 | Makimoto et al. | .......... | 348/208.7 |
| 8,264,549 B2 * | 9/2012 | Tokiwa et al. | ............ | 348/208.11 |
| 2006/0017818 A1 * | 1/2006 | Enomoto | .................... | 348/219.1 |
| 2007/0257989 A1 * | 11/2007 | Shirono | .................... | 348/208.99 |
| 2008/0187301 A1 * | 8/2008 | Takahashi | ........................ | 396/55 |
| 2009/0002502 A1 * | 1/2009 | Shirono | .................... | 348/208.99 |
| 2009/0040317 A1 * | 2/2009 | Park et al. | .................... | 348/208.2 |
| 2009/0091832 A1 * | 4/2009 | Nagai et al. | .................... | 359/557 |
| 2009/0310953 A1 * | 12/2009 | Yoneoka et al. | ................ | 396/55 |
| 2010/0165132 A1 * | 7/2010 | Tokiwa et al. | ............ | 348/208.11 |
| 2011/0262121 A1 * | 10/2011 | Yanagisawa et al. | ........... | 396/55 |
| 2013/0163974 A1 * | 6/2013 | Takei et al. | ...................... | 396/55 |

FOREIGN PATENT DOCUMENTS

JP 2010-145575 A 7/2010

* cited by examiner

*Primary Examiner* — Tuan Ho
*Assistant Examiner* — Selam Gebriel
(74) *Attorney, Agent, or Firm* — Rader, Fishman & Grauer PLLC

(57) ABSTRACT

A blur correction device includes: a base body; a holder that holds an optical element; a drive section that moves the holder with respect to the base body in two directions that are orthogonal to a direction of an optical axis of the optical element and that are orthogonal to each other; and a plate spring that couples the base body and the holder to each other and that urges the holder in the optical axis direction to position the optical element with respect to the base body, the plate spring being elastically deformed when the holder is moved with respect to the base body in the two directions.

16 Claims, 36 Drawing Sheets

BLUR CORRECTION DEVICE AND IMAGING APPARATUS

BACKGROUND

The present technology relates to the technical field of blur correction devices and imaging apparatuses. More particularly, the present technology relates to the technical field of improving the positional accuracy of an optical element in the optical axis direction in addition to securing a size reduction by coupling a holder that holds the optical element to a base body using a plate spring that urges the holder with respect to the base body in the optical axis direction.

Some imaging apparatuses such as camera modules incorporated in video cameras, still cameras, cellular phones, and personal computers are provided with a blur correction device that moves a lens or an imaging element serving as an optical element in a direction orthogonal to the optical axis direction to correct blur.

In some blur correction devices, a base body and a holder that holds an optical element (lens or imaging element) are coupled to each other by a plate spring, and the holder is moved with respect to the base body in a direction orthogonal to the optical axis direction to correct blur (see Japanese Unexamined Patent Application Publication No. 2010-145575, for example).

In the blur correction device according to Japanese Unexamined Patent Application Publication No. 2010-145575, a retention substrate is coupled to a base body (base member) by a pair of first plate springs, a holder is coupled to the retention substrate by a pair of second plate springs, and the first plate springs and the second plate springs are elastically deformed when the holder is moved with respect to the base body in a direction orthogonal to the optical axis direction.

SUMMARY

In the blur correction device according to Japanese Unexamined Patent Application Publication No. 2010-145575, the holder is coupled to the base body via a plurality of plate springs, and the plate springs are oriented in a direction orthogonal to the optical axis direction, improving the positional accuracy of the holder with respect to the base body in the optical axis direction.

In the blur correction device according to Japanese Unexamined Patent Application Publication No. 2010-145575, however, the holder is coupled to the base body via the plate springs and the retention substrate. That is, a plurality of members are interposed between the holder and the base body, accordingly increasing the number of components and the size of the device in a direction orthogonal to the optical axis direction.

In addition, the holder is disposed inside the base body and the retention substrate, making the outside dimensions in a direction orthogonal to the optical axis direction larger. Moreover, the width direction of the plate springs coincides with the optical axis direction, making a size reduction in the optical axis direction difficult.

In view of the foregoing, it is desirable to improve the positional accuracy of an optical element in the optical axis direction in addition to securing a size reduction.

According to an embodiment, there is provided a blur correction device including a base body, a holder that holds an optical element, a drive section that moves the holder with respect to the base body in two directions that are orthogonal to a direction of an optical axis of the optical element and that are orthogonal to each other, and a plate spring that couples the base body and the holder to each other and that urges the holder in the optical axis direction to position the optical element with respect to the base body, the plate spring being elastically deformed when the holder is moved with respect to the base body in the two directions.

Thus, in the blur correction device, the holder is urged in the optical axis direction by the plate spring to be positioned with respect to the base body.

According to an embodiment, the plate spring may include a first link portion linked to the holder, a second link portion linked to the base body, and a deformable portion that is positioned between the first link portion and the second link portion and that is elastically deformable, and a portion of the deformable portion may be folded to be oriented in a direction different from the optical axis direction.

With a portion of the deformable portion folded to be oriented in a direction different from the optical axis direction, urging forces for the holder are varied in accordance with the folding angle.

According to an embodiment, an outermost portion of the deformable portion may be folded.

With the outermost portion of the deformable portion folded, the outside dimensions of the plate spring are made smaller.

According to an embodiment, a portion of the deformable portion may be folded to be oriented in a direction orthogonal to the optical axis direction.

With a portion of the deformable portion folded to be oriented in a direction orthogonal to the optical axis direction, urging forces of the folded portion for the holder in a direction orthogonal to the optical axis direction are maximized.

According to an embodiment, the first link portion may be formed in a shape of an annulus oriented in the optical axis direction, and a plurality of the deformable portions may be provided in a spaced manner in a circumferential direction of the first link portion to project outward from the first link portion.

With the first link portion formed in the shape of an annulus oriented in the optical axis direction, and with a plurality of deformable portions provided in a spaced manner in the circumferential direction of the first link portion to project outward from the first link portion, urging forces are applied to the holder by the plurality of deformable portions.

According to an embodiment, the plurality of deformable portions may be provided at point-symmetric positions about the optical axis.

With the plurality of deformable portions provided at point-symmetric positions about the optical axis, the holder is held stably with respect to the base body.

According to an embodiment, the deformable portions may be provided at equal intervals.

With the deformable portions provided at equal intervals, urging forces with the same magnitude are applied from the deformable portions to the holder.

According to an embodiment, the deformable portion may include a first urging portion that applies an urging force in a third direction to the holder when the holder is moved in a first direction orthogonal to the optical axis direction, and a second urging portion that applies an urging force in a fourth direction to the holder when the holder is moved in a second direction that is orthogonal to the optical axis direction and that is orthogonal to the first direction, the third direction being opposite the first direction, and the fourth direction being opposite the second direction.

With the deformable portion including a first urging portion that applies an urging force when the holder is moved in a first direction and a second urging portion that applies an urging force when the holder is moved in a second direction, urging forces are applied to the holder from the first urging portion or the second urging portion, depending on the direction of movement of the holder.

According to an embodiment, the first urging portion may be shaped to include a pair of straight portions positioned in parallel with each other.

With the first urging portion shaped to include a pair of straight portions positioned in parallel with each other, the space for arrangement of the first urging portion is reduced.

According to an embodiment, the second urging portion may be shaped to include a pair of straight portions positioned in parallel with each other.

With the second urging portion shaped to include a pair of straight portions positioned in parallel with each other, the space for arrangement of the second urging portion is reduced.

According to an embodiment, the deformable portion may include a third urging portion that urges the holder in a direction of bringing the holder closer to the base body in the optical axis direction, and the third urging portion may be shaped to include at least a pair of straight portions positioned in parallel with each other.

With the third urging portion shaped to include at least a pair of straight portions positioned in parallel with each other, the space for arrangement of the third urging portion is reduced.

According to an embodiment, the third urging portions may be provided separately between the first link portion and the first urging portion, between the first urging portion and the second urging portion, and between the second urging portion and the second link portion.

With the third urging portions provided separately between the first link portion and the first urging portion, between the first urging portion and the second urging portion, and between the second urging portion and the second link portion, the space for arrangement of the deformable portion is reduced.

According to an embodiment, the blur correction device may further include a drive coil attached to one of the base body and the holder, and a drive magnet attached to the other of the base body and the holder and positioned opposite the drive coil, and the drive coil and the drive magnet may serve as the drive section.

With the drive coil and the drive magnet provided to serve as the drive section, a large drive force is output with a simple configuration.

According to an embodiment, two pairs of the drive coils and two pairs of the drive magnets may be disposed opposite each other across the optical axis and at the same distance from the optical axis.

With two pairs of drive coils and two pairs of drive magnets disposed opposite each other across the optical axis and at the same distance from the optical axis, a maximum drive force is applied to the center of the optical element.

According to an embodiment, ball members may be disposed between the base body and the holder so as to be rollable with respect to the base body and the holder, and the holder may be pressed against the ball members by the plate spring.

With ball members disposed between the base body and the holder so as to be rollable with respect to the base body and the holder, and with the holder pressed against the ball members by the plate spring, the ball members are rolled when the holder is moved with respect to the base body in a direction orthogonal to the optical axis direction.

According to an embodiment of the present technology, there is provided an imaging apparatus including a blur correction device that moves an optical element in a direction orthogonal to a direction of an optical axis of the optical element to correct blur, the blur correction device including a base body, a holder that holds the optical element, a drive section that moves the holder with respect to the base body in two directions that are orthogonal to the optical axis direction and that are orthogonal to each other, and a plate spring that couples the base body and the holder to each other and that urges the holder in the optical axis direction to position the optical element with respect to the base body, the plate spring being elastically deformed when the holder is moved with respect to the base body in the two directions.

Thus, in the imaging apparatus, the holder is urged in the optical axis direction by the plate spring to be positioned with respect to the base body.

According to an embodiment of the present technology, there is provided a blur correction device including a base body, a holder that holds an optical element, a drive section that moves the holder with respect to the base body in two directions that are orthogonal to a direction of an optical axis of the optical element and that are orthogonal to each other, and a plate spring that couples the base body and the holder to each other and that urges the holder in the optical axis direction to position the optical element with respect to the base body, the plate spring being elastically deformed when the holder is moved with respect to the base body in the two directions.

Thus, a plurality of members are not interposed between the holder and the base body, improving the positional accuracy of the optical element in the optical axis direction in addition to securing a size reduction.

In a technology according to an embodiment, the plate spring may include a first link portion linked to the holder, a second link portion linked to the base body, and a deformable portion that is positioned between the first link portion and the second link portion and that is elastically deformable, and a portion of the deformable portion may be folded to be oriented in a direction different from the optical axis direction.

This enables adjustment of urging forces for the holder, and promotes a size reduction in a direction orthogonal to the optical axis direction.

In a technology according to an embodiment, an outermost portion of the deformable portion may be folded.

This promotes a further size reduction in a direction orthogonal to the optical axis direction.

In a technology according to an embodiment, a portion of the deformable portion may be folded to be oriented in a direction orthogonal to the optical axis direction.

This allows the plate spring to efficiently apply urging forces to the holder, and promotes a size reduction in a direction orthogonal to the optical axis direction.

In a technology according to an embodiment, the first link portion may be formed in a shape of an annulus oriented in the optical axis direction, and a plurality of the deformable portions may be provided in a spaced manner in a circumferential direction of the first link portion to project outward from the first link portion.

Thus, appropriate urging forces in the optical axis direction may be applied to the holder.

In a technology according to an embodiment, the plurality of deformable portions may be provided at point-symmetric positions about the optical axis.

This allows the optical element to be held stably with respect to the base body, and allows the optical element to be moved in a direction orthogonal to the optical axis direction in a well-balanced manner during a blur correction operation.

In a technology according to an embodiment, the deformable portions may be provided at equal intervals.

This allows the optical element to be moved in the optical axis direction and a direction orthogonal to the optical axis direction in a well-balanced manner in addition to securing appropriate urging forces applied to the holder.

In a technology according to an embodiment, the deformable portion may include a first urging portion that applies an urging force in a third direction to the holder when the holder is moved in a first direction orthogonal to the optical axis direction, and a second urging portion that applies an urging force in a fourth direction to the holder when the holder is moved in a second direction that is orthogonal to the optical axis direction and that is orthogonal to the first direction, the third direction being opposite the first direction, and the fourth direction being opposite the second direction.

This allows appropriate urging forces to be applied to the holder in addition to promoting simplification of the structure of the plate spring.

In a technology according to an embodiment, the first urging portion may be shaped to include a pair of straight portions positioned in parallel with each other.

This allows appropriate urging forces in a direction orthogonal to the optical axis direction to be applied to the holder in addition to securing a size reduction by reducing the space for arrangement of the first urging portion.

In a technology according to an embodiment, the second urging portion may be shaped to include a pair of straight portions positioned in parallel with each other.

This allows appropriate urging forces in a direction orthogonal to the optical axis direction to be applied to the holder in addition to securing a size reduction by reducing the space for arrangement of the second urging portion.

In a technology according to an embodiment, the deformable portion may include a third urging portion that urges the holder in a direction of bringing the holder closer to the base body in the optical axis direction, and the third urging portion may be shaped to include at least a pair of straight portions positioned in parallel with each other.

This allows appropriate urging forces in the optical axis direction to be applied to the holder in addition to securing a size reduction by reducing the space for arrangement of the third urging portion.

In a technology according to an embodiment, the third urging portions may be provided separately between the first link portion and the first urging portion, between the first urging portion and the second urging portion, and between the second urging portion and the second link portion.

This allows appropriate urging forces in the optical axis direction to be applied to the holder in addition to securing a size reduction of the plate spring by reducing the space for arrangement of the third urging portions.

In a technology according to an embodiment, the blur correction device may further include a drive coil attached to one of the base body and the holder, and a drive magnet attached to the other of the base body and the holder and positioned opposite the drive coil, and the drive coil and the drive magnet may serve as the drive section.

Thus, a large drive force may be secured with a simple configuration, improving the reliability of the blur correction operation.

In a technology according to an embodiment, two pairs of the drive coils and two pairs of the drive magnets may be disposed opposite each other across the optical axis and at the same distance from the optical axis.

Thus, a maximum drive force is applied to the center of the optical element, allowing the holder to be moved stably with respect to the base body in a well-balanced manner.

In a technology according to an embodiment, ball members may be disposed between the base body and the holder so as to be rollable with respect to the base body and the holder, and the holder may be pressed against the ball members by the plate spring.

Thus, the ball members are rolled when the holder is moved with respect to the base body in a direction orthogonal to the optical axis direction, allowing the holder to be smoothly moved with respect to the base body.

According to an embodiment of the present technology, there is provided an imaging apparatus including a blur correction device that moves an optical element in a direction orthogonal to a direction of an optical axis of the optical element to correct blur, the blur correction device including a base body, a holder that holds the optical element, a drive section that moves the holder with respect to the base body in two directions that are orthogonal to the optical axis direction and that are orthogonal to each other, and a plate spring that couples the base body and the holder to each other and that urges the holder in the optical axis direction to position the optical element with respect to the base body, the plate spring being elastically deformed when the holder is moved with respect to the base body in the two directions.

Thus, a plurality of members are not interposed between the holder and the base body, improving the positional accuracy of the optical element in the optical axis direction in addition to securing a size reduction.

DETAILED DESCRIPTION OF EMBODIMENTS

A blur correction device and an imaging apparatus according to an embodiment of the present technology will be described below with reference to the accompanying drawings.

In the following description, the imaging apparatus according to the embodiment of the present technology is applied to a cellular phone having an imaging function, and the blur correction device according to the embodiment of the present technology is applied to a blur correction device incorporated in the cellular phone.

The scopes of application of the imaging apparatus and the blur correction device according to the embodiment of the present technology are not limited to a cellular phone and a blur correction device incorporated in the cellular phone, respectively. For example, the imaging apparatus and the blur correction device according to the embodiment of the present technology may be widely applied to various imaging apparatuses such as still cameras, video cameras, and information processing devices such as personal digital assistants (PDAs) having an imaging function and personal computers having an imaging function, and various blur correction devices incorporated in such imaging apparatuses, respectively.

In the following description, the terms related to directions indicate front, rear, upper, lower, left, and right directions as seen from an image capturing person when he/she captures an image using the cellular phone. Thus, the forward direction indicates the side of a subject to be imaged, and the rearward direction indicates the side of the image capturing person.

The terms "forward, rearward, upward, downward, leftward, and rightward directions" used in the following description are used for convenience of description, and the embodiment of the present technology is not limited to such directions.

[Overall Configuration of Imaging Apparatus]

Figure 1:
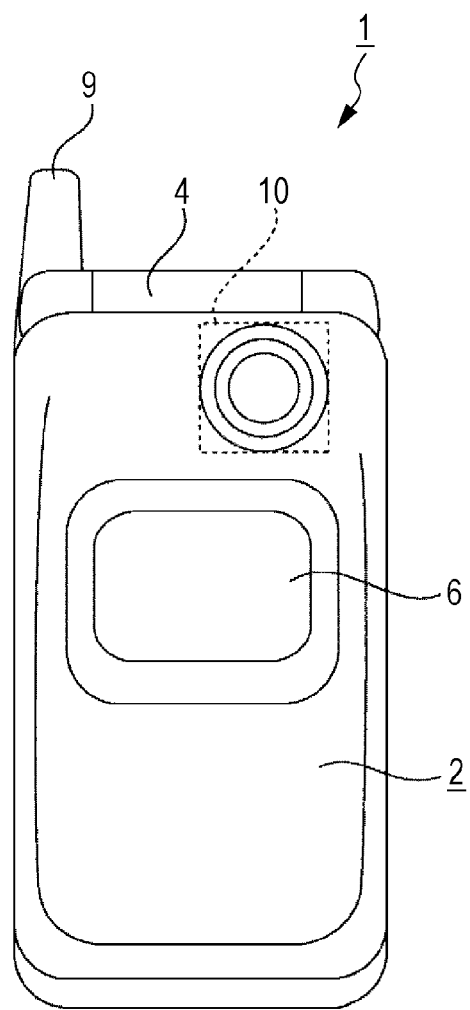
FIG. 1 shows a blur correction device and an imaging apparatus according to an embodiment of the present technology in conjunction with FIGS. 2 to 36, FIG. 1 being a front view of the imaging apparatus.
Figure 2:
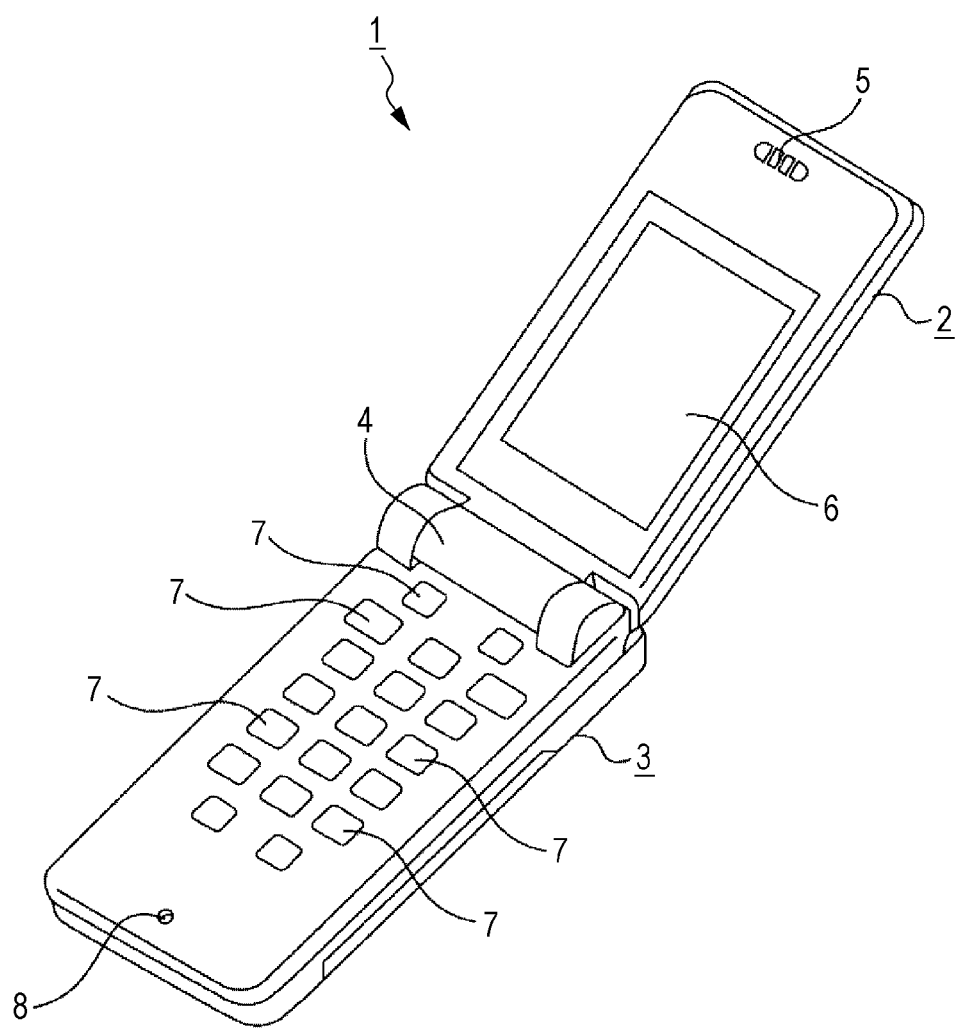
FIG. 2 is a perspective view of the imaging apparatus.

An imaging apparatus (cellular phone) 1 includes a first housing 2 and a second housing 3 linked to each other via a hinge portion 4 so as to be foldable, for example (see FIGS. 1 and 2). The first housing 2 and the second housing 3 of the imaging apparatus 1 may be configured to be slidable with respect to each other, or the imaging apparatus 1 may include only one housing.

The first housing 2 is provided with a speaker 5 and displays 6, 6.

The second housing 3 is provided with various operation portions 7, 7, . . . such as a push button and a rotary dial, a microphone 8, and an antenna 9.

An imaging unit 10 is incorporated inside the second housing 3. A predetermined push button, of the operation portions 7, 7, . . . , is used to capture an image. Pressing the operation portion 7 activates the imaging unit 10 to capture an image.

[Configuration of Imaging Unit]

Figure 3:
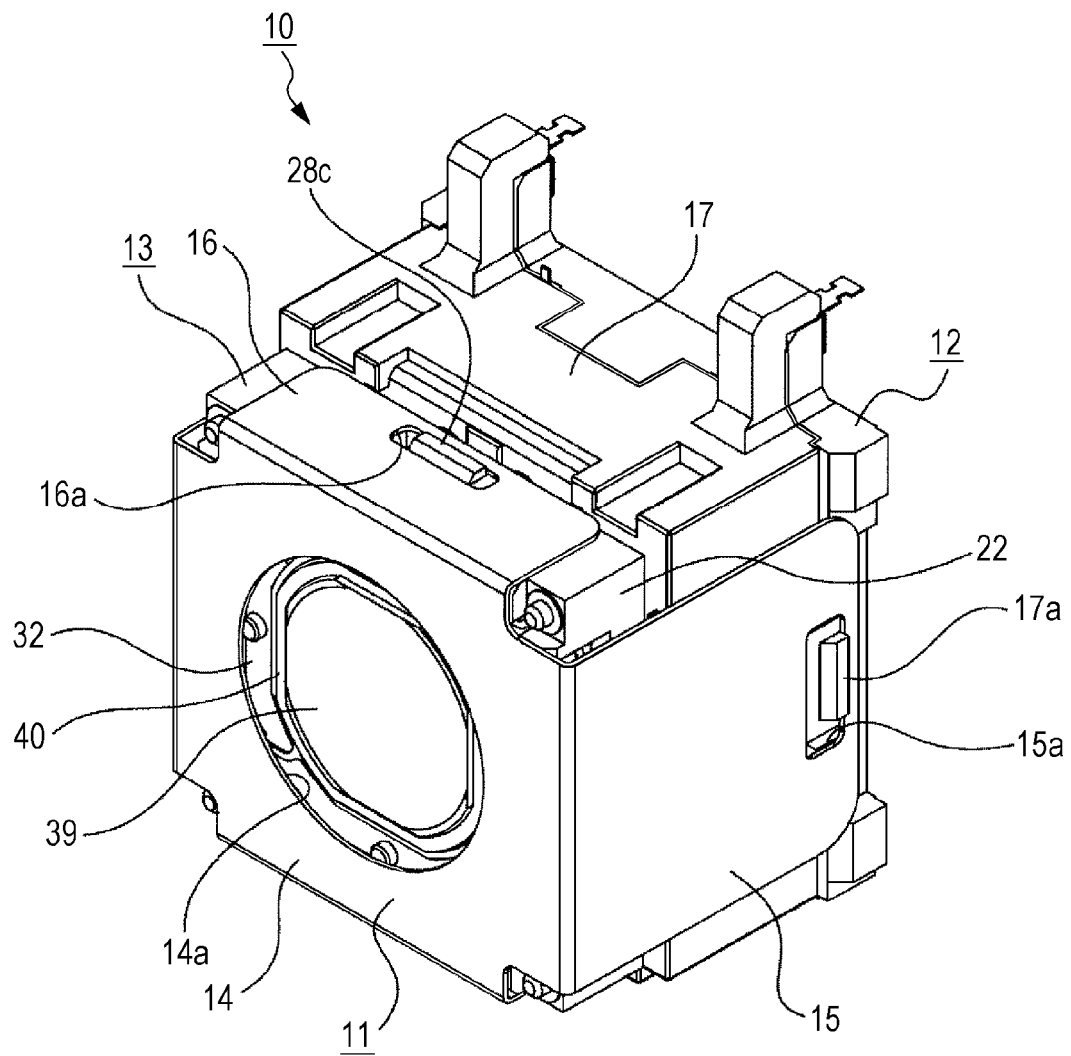
FIG. 3 is an enlarged perspective view of an imaging unit.
Figure 4:
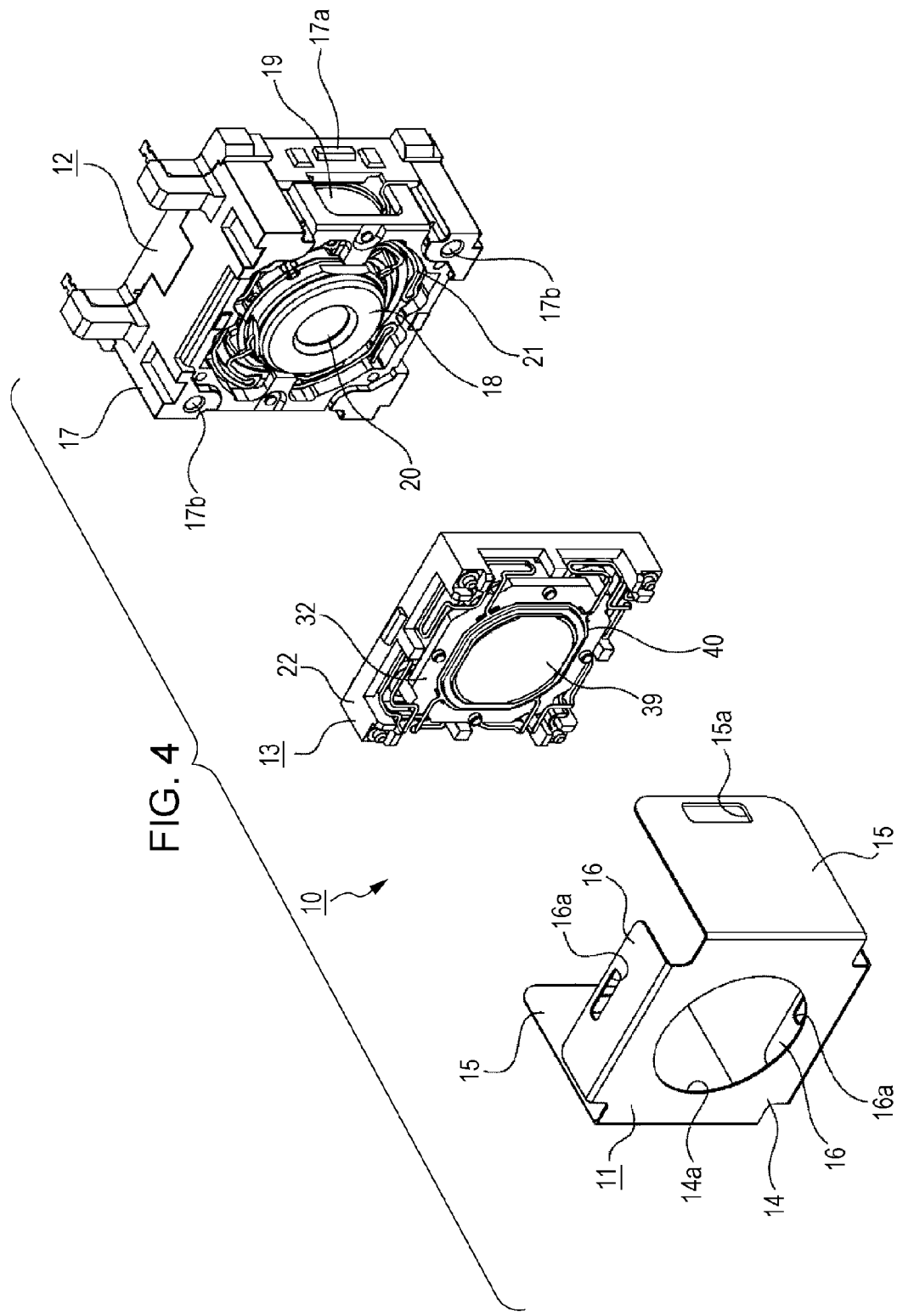
FIG. 4 is a perspective view of the imaging unit showing a cover, the blur correction device, and a camera module as exploded.

The imaging unit 10 includes a cover 11, a camera module 12, and a blur correction device 13 (see FIGS. 3 and 4).

The cover 11 includes a cover surface portion 14 oriented in the front-rear direction and having a generally square outer shape, and link surface portions 15, 15, 16, 16 projecting rearward from the outer periphery of the cover surface portion 14. The cover surface portion 14 and the link surface portions 15, 15, 16, 16 are formed integrally with each other.

A circular light transmission hole 14a is formed in the cover surface portion 14.

The link surface portions 15, 15 are positioned opposite each other, and have link holes 15a, 15a at their rear end portions.

The link surface portions 16, 16 are positioned opposite each other, and oriented at an angle of 90° with respect to the link surface portions 15, 15. The link surface portions 16, 16 are shorter in front-rear length than the link surface portions 15, 15, and have link holes 16a, 16a at their rear end portions.

The link surface portions 15, 15, 16, 16 are elastically deformable with their portions coupled to the cover surface portion 14 serving as fulcrums.

The camera module 12 includes a box-like case 17 opening forward, and an imaging block 18 disposed inside the case 17.

Link projecting portions 17a, 17a projecting laterally (outward) are provided at rear end portions of two side surface portions of the case 17 positioned opposite each other. Fitting holes 17b, 17b opening forward are formed at two corner portions of the upper end portion of the case 17.

The imaging block 18 is a movable lens block having a focusing function and a zooming function, for example, and includes a lens holder 19, a lens 20 or a lens group held by the lens holder 19, and a pair of urging springs 21, 21 (only one urging spring 21 is shown in FIG. 4) that hold the lens holder 19 by sandwiching the lens holder 19 from the front and rear sides. The lens holder 19 is movable in the front-rear direction (optical axis direction). The urging springs 21, 21 are elastically deformed when the lens holder 19 is moved in the front-rear direction.

The blur correction device 13 has its components supported by or disposed on a base body 22 (see FIGS. 4 to 10).

Figure 11:
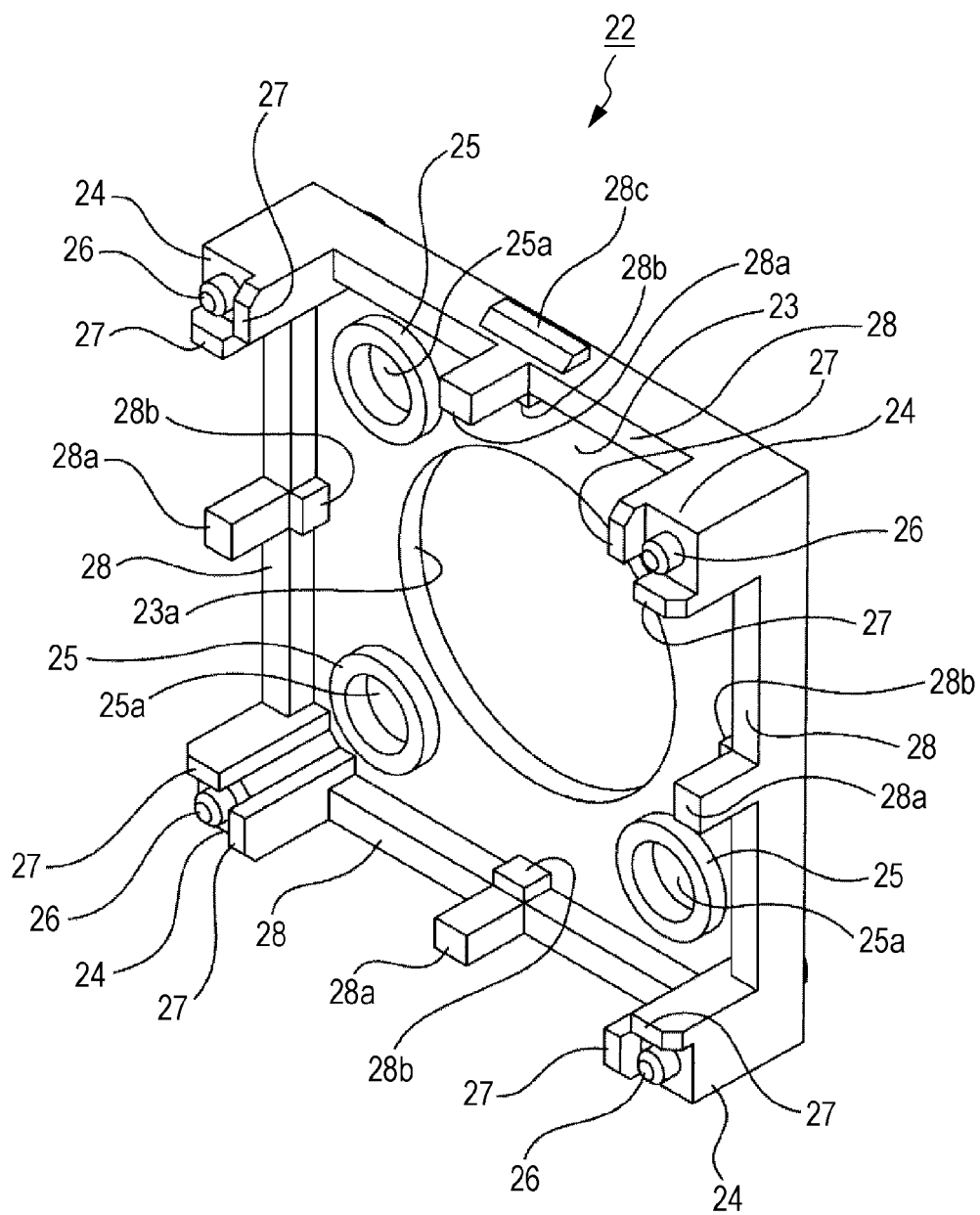
FIG. 11 is an enlarged perspective view of a base body.

The base body 22 includes a bottom plate portion 23 in the shape of a square oriented in the front-rear direction, and column portions 24, 24, ... projecting forward from the four corners of the bottom plate portion 23 (see FIG. 11).

A circular transmission hole 23a is formed in the bottom plate portion 23. Four ball member restriction portions 25, 25, ... projecting forward are provided on the front surface of the bottom plate portion 23 in a spaced manner in the circumferential direction. The ball member restriction portion 25 is formed in an annular shape, with the space inside the ball member restriction portion 25 formed as a ball reception portion 25a.

Figure 9:
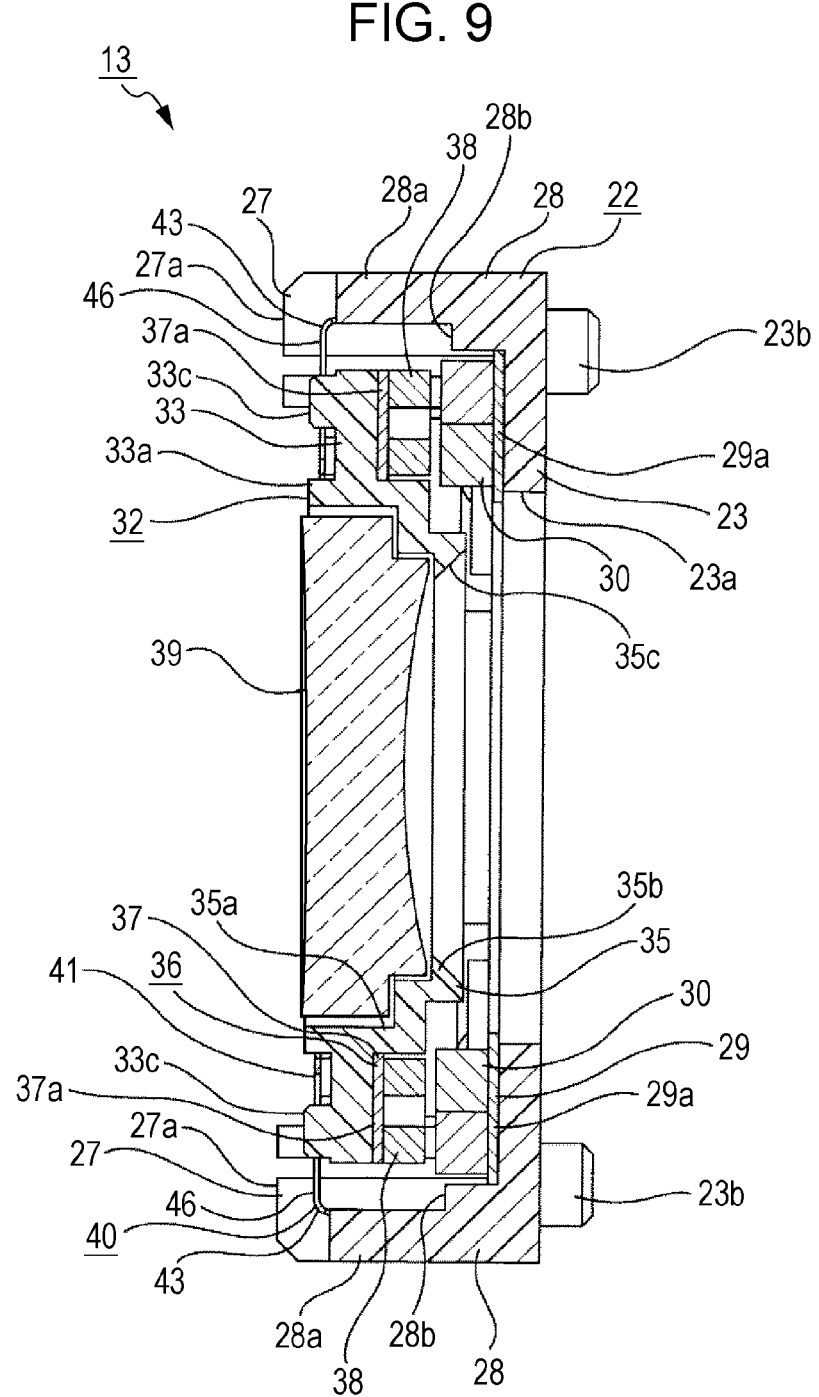
FIG. 9 is a cross-sectional view taken along the line IX-IX of FIG. 8.
Figure 10:
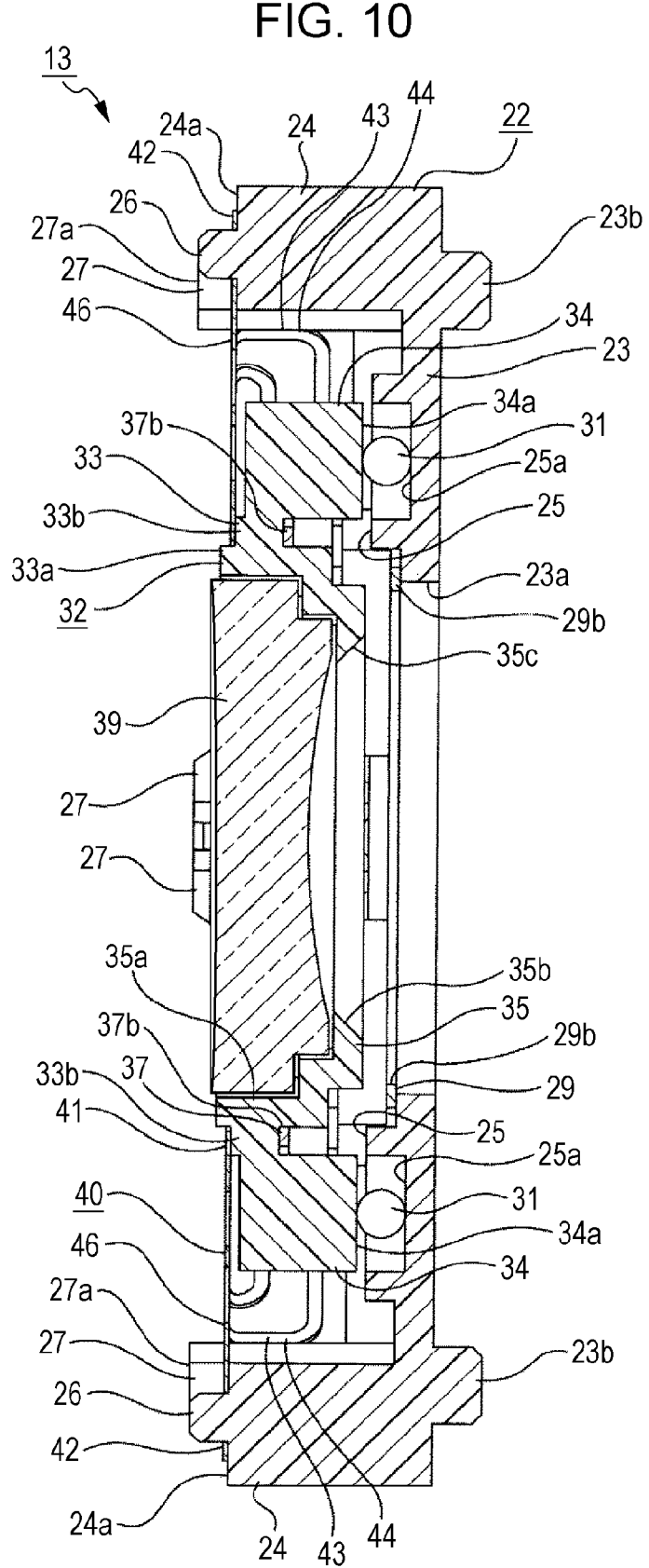
FIG. 10 is a cross-sectional view taken along the line X-X of FIG. 8.

Fitting pins 23b, 23b projecting rearward are provided at two corner portions of the rear surface of the bottom plate portion 23 (see FIGS. 9 and 10).

Figure 12:
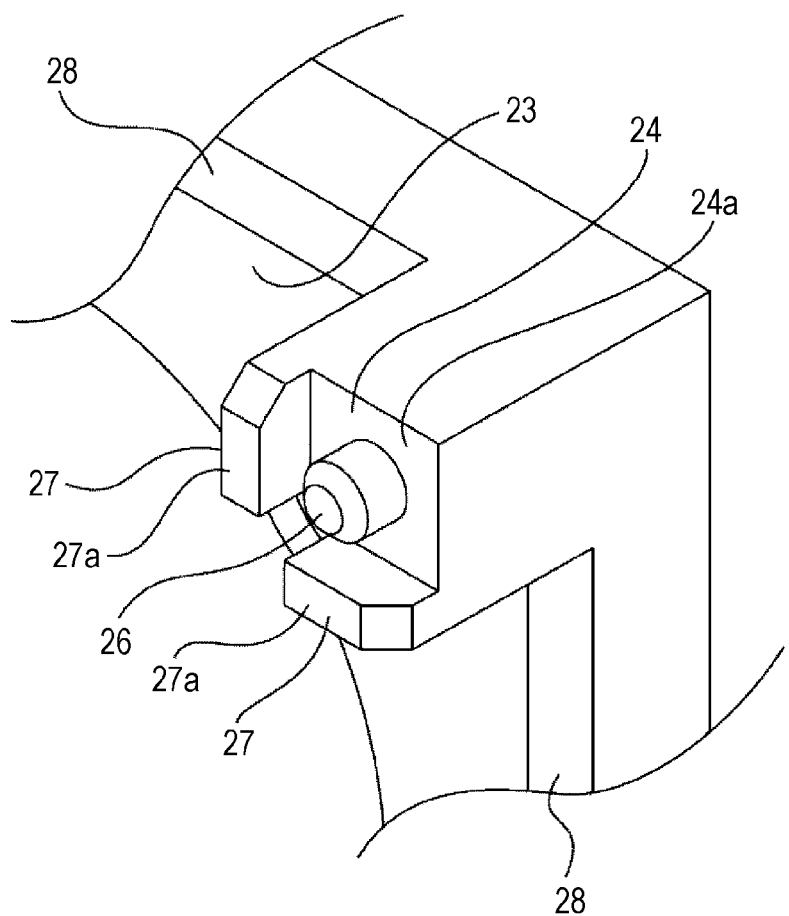
FIG. 12 is an enlarged perspective view showing a part of the base body.

The column portion 24 is formed in a generally rectangular parallelepiped shape, with its front surface formed as a spring reception surface 24a (see FIG. 12). The column portion 24 is provided with a positioning pin 26 projecting forward from the center portion of the spring reception surface 24a. The column portion 24 is provided with ribs 27, 27 projecting forward from two adjacent side edge portions positioned on the inner side of the spring reception surface 24a, with the front surfaces of the ribs 27, 27 formed as cover reception surfaces 27a, 27a.

Coupling portions 28, 28, ... are provided between the column portions 24, 24, ..., and project forward from the outer periphery of the front surface of the bottom plate portion 23 (see FIG. 11). A restriction projecting portion 28a projecting forward is provided at the center portion of the coupling portion 28 between the column portions 24, 24. A positioning projecting portion 28b is provided at the center portion of the coupling portion 28 between the column portions 24, 24, and projects inward from the inner surface of the coupling portion 28.

Two coupling portions 28, 28 positioned opposite each other are provided with link projecting portions 28c, 28c projecting outward from the outer surface of the coupling portions 28, 28. The link projecting portions 28c, 28c are positioned opposite the positioning projecting portions 28b, 28b.

Figure 5:
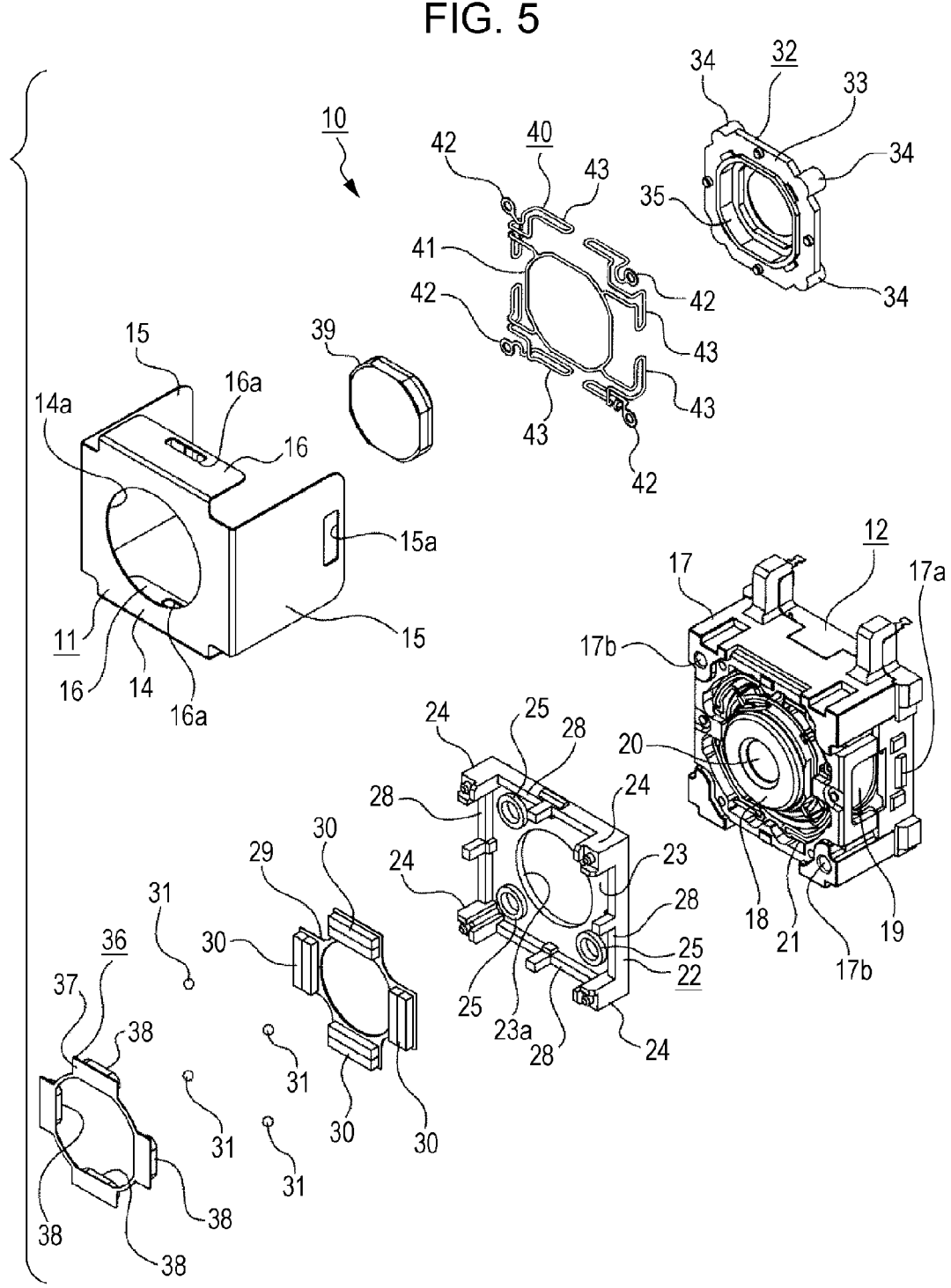
FIG. 5 is an exploded perspective view of the imaging unit.
Figure 13:
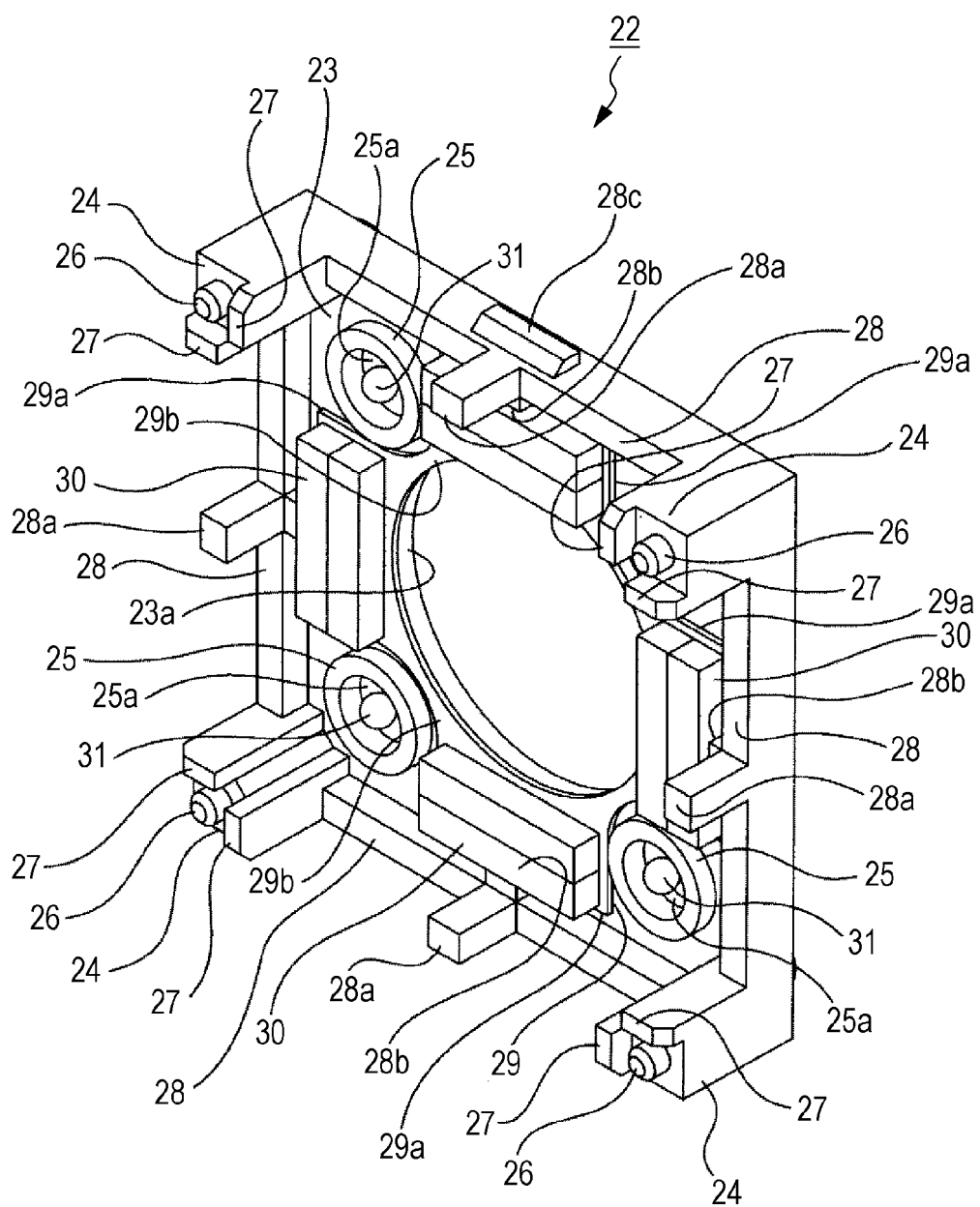
FIG. 13 is an enlarged perspective view showing a state in which a yoke is fixed to the base body and ball members are disposed on the base body.

A yoke 29 is fixed to the base body 22 (see FIGS. 4, 5, and 13). The yoke 29 is formed in an annular flat plate shape with its axis extending in the front-rear direction, and includes four magnet fixation portions 29a, 29a, ... positioned in a spaced manner at equal intervals in the circumferential direction, and coupling piece portions 29b, 29b, ... that couple the magnet fixation portions 29a, 29a, ... to each other. The magnet fixation portions 29a, 29a, ... and the coupling piece portions 29b, 29b, ... are formed integrally with each other.

The yoke 29 is fixed to the front surface of the bottom plate portion 23 of the base body 22 by bonding or the like (see FIG. 13). With the yoke 29 fixed to the front surface of the bottom plate portion 23, the ball member restriction portions 25, 25, ... are positioned on the outer side of the coupling piece portions 29b, 29b, ....

Drive magnets 30, 30, ... are fixed to the magnet fixation portions 29a, 29a, ... of the yoke 29 (see FIG. 11). The drive magnets 30, 30, ... are fixed to the base body 22 via the yoke 29.

Spherical bodies 31, 31, ... are disposed in the ball reception portions 25a, 25a, ... formed inside the ball member restriction portions 25, 25, ... of the base body 22 so as to be rollable with respect to the bottom plate portion 23 (FIG. 13).

Figure 6:
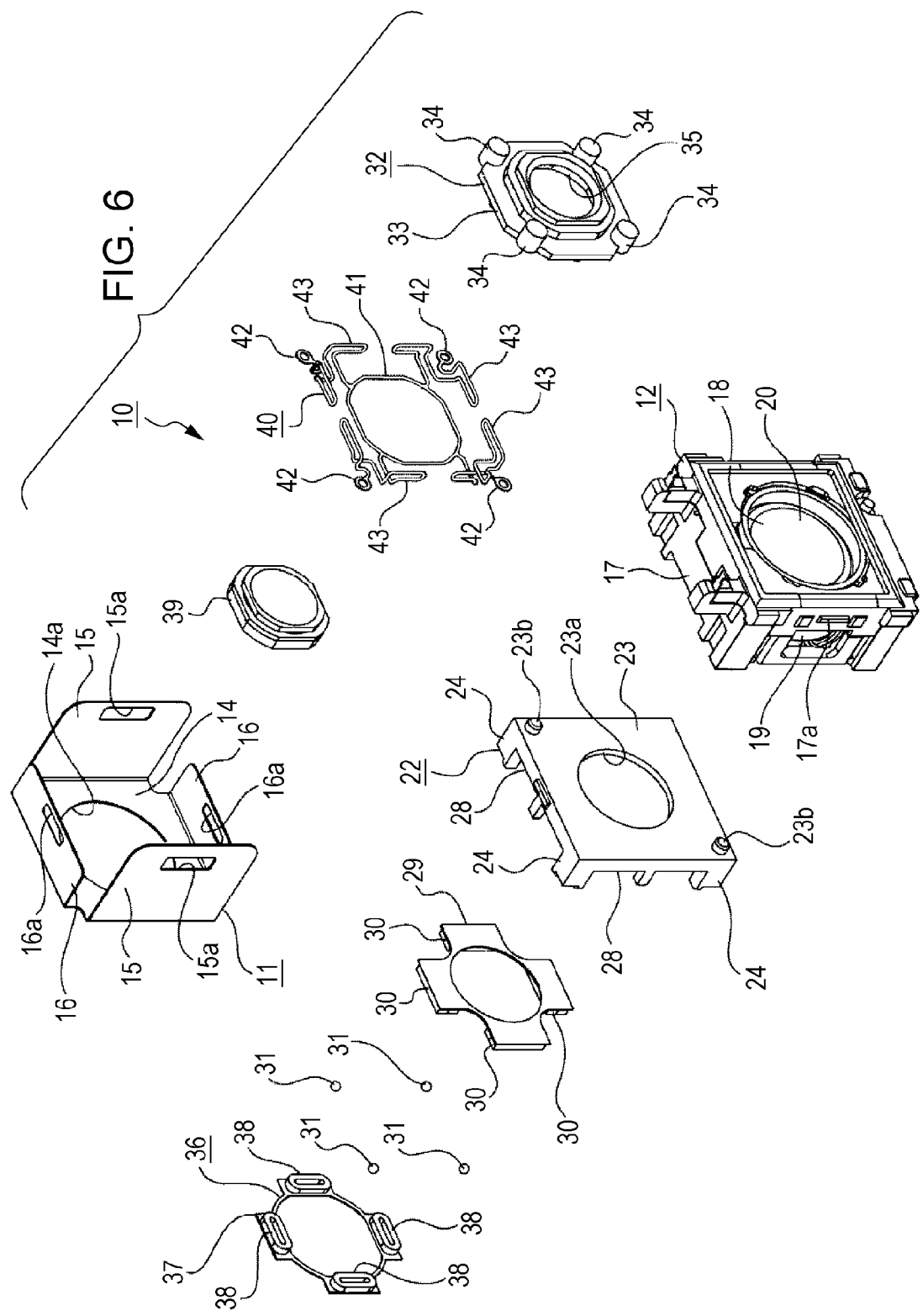
FIG. 6 is an exploded perspective view of the imaging unit, showing the imaging unit as seen from a direction different from the direction of FIG. 5.
Figure 14:
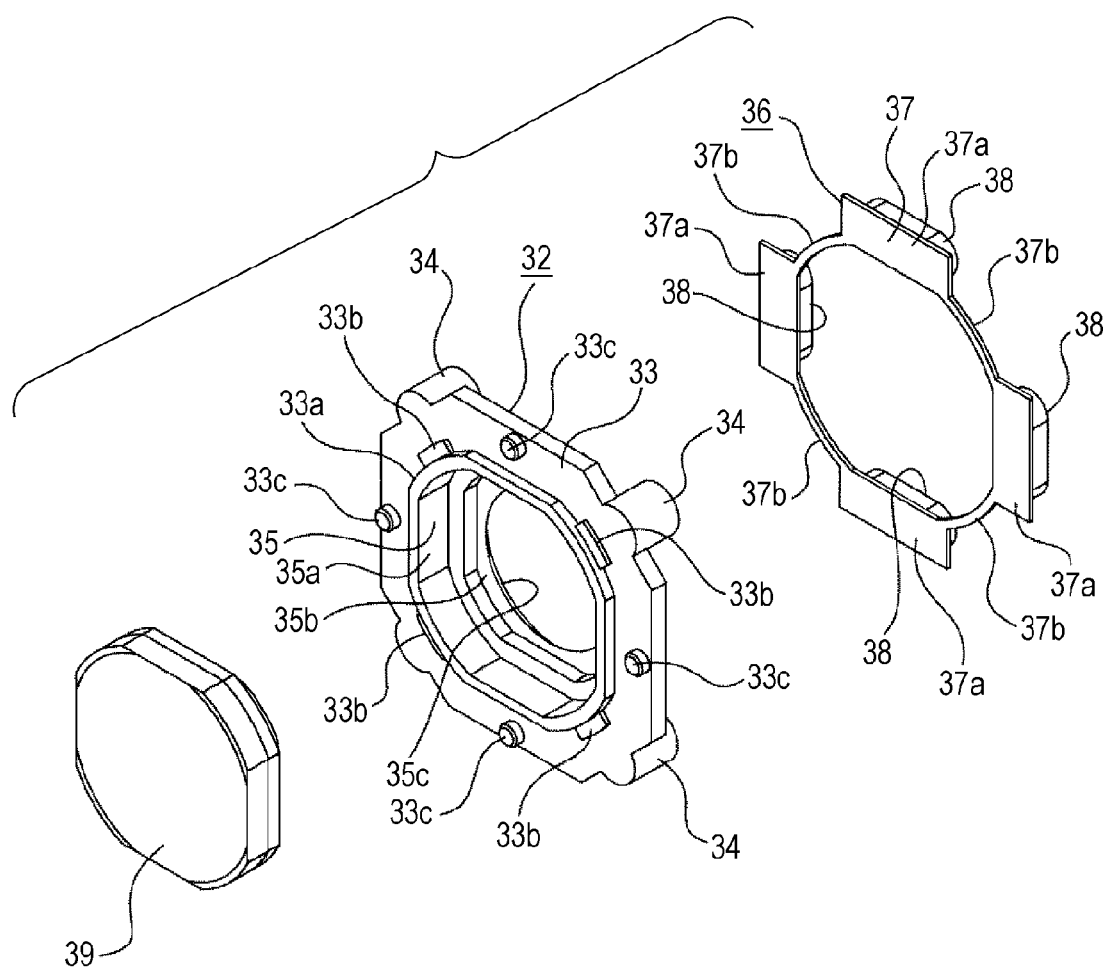
FIG. 14 is an enlarged exploded perspective view showing the optical element, the holder, and a coil body.
Figure 15:
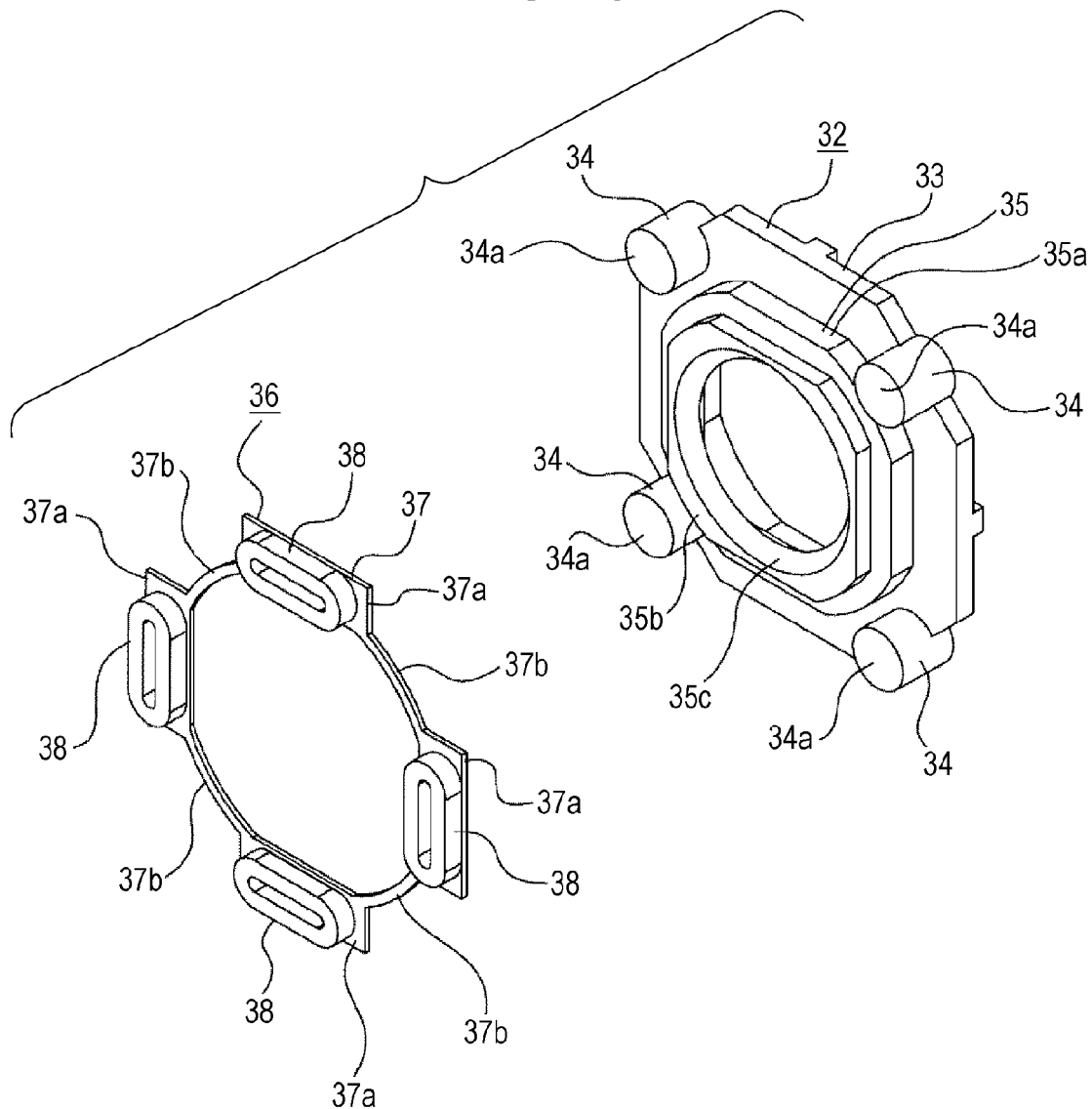
FIG. 15 is an enlarged exploded perspective view showing the holder and the coil body.

A holder 32 is disposed on the front side of the base body 22 (see FIGS. 5 and 6). As shown in FIGS. 14 and 15, the holder 32 includes a flat spring attachment portion 33 oriented in the front-rear direction and having a generally rectangular outer shape, positioning projecting portions 34, 34, ... projecting rearward from the four corner portions of the spring attachment portion 33, and an element holding portion 35 provided at the inner periphery of the spring attachment portion 33. The spring attachment portion 33, the positioning projecting portions 34, 34, ..., and the element holding portion 35 are formed integrally with each other.

The spring attachment portion 33 is formed in an annular shape. An annular upright wall portion 33a projecting forward is provided at the inner periphery of the front surface of the spring attachment portion 33 (see FIG. 14).

The spring attachment portion 33 is provided with four spring reception portions 33b, 33b, ... projecting forward from the front surface of the spring attachment portion 33 and provided in a spaced manner at equal intervals in the circumferential direction. The spring reception portions 33b, 33b, ... are continuous with the outer peripheral surface of the upright wall portion 33a, and positioned on the inner side of positioning projecting portions 34, 34, .... The front surfaces of the spring reception portions 33b, 33b, ... are positioned on the rear side with respect to the front surface of the upright wall portion 33a (see FIG. 10).

Reception pins 33c, 33c, ... projecting forward are provided on the front surface of the spring attachment portion 33 in a spaced manner at equal intervals in the circumferential direction (see FIG. 14). The reception pins 33c, 33c, ... are provided at the center portion between the positioning projecting portions 34, 34, ..., and the front surfaces of the reception pins 33c, 33c, ... are positioned forward of the front surface of the upright wall portion 33a (see FIG. 10).

The rear surface of the positioning projecting portion 34 is formed as a ball contact surface 34a (see FIG. 15).

As shown in FIGS. 14 and 15, the element holding portion 35 includes a peripheral wall portion 35a projecting rearward from the inner periphery of the spring attachment portion 33, and an overhanging portion 35b overhanging inward from the rear end portion of the peripheral wall portion 35a. A circular transmission hole 35c is formed inside the overhanging portion 35b.

A coil body 36 is fixed to the holder 32 (see FIGS. 5, 6, and 15). The coil body 36 includes a wiring plate 37 and four drive coils 38, 38, .... The wiring plate 37 is formed in an annular flat plate shape with its axis extending in the front-rear direction, and includes four coil fixation portions 37a, 37a, ... positioned in a spaced manner at equal intervals in the circumferential direction, and cross-link portions 37b, 37b, ... that couple the coil fixation portions 37a, 37a, ... to each other. The coil fixation portions 37a, 37a, ... and the cross-link portions 37b, 37b, ... are formed integrally with each other.

The wiring plate 37 is fixed to the rear surface of the spring attachment portion 33 of the holder 32 by bonding or the like (see FIG. 15). With the wiring plate 37 fixed to the rear surface of the spring attachment portion 33, the positioning projecting portions 34, 34, ... are positioned on the outer side of the cross-link portions 37b, 37b, ....

The drive coils 38, 38, ... are fixed to the coil fixation portions 37a, 37a, ... of the wiring plate 37. The drive coils 38, 38, ... are fixed to the holder 32 via the wiring plate 37.

Of the drive coils 38, 38, ..., a pair of drive coils 38, 38 positioned opposite each other across the center of the coil body 36 are electrically connected to each other, and the other pair of drive coils 38, 38 are also electrically connected to each other, through the wiring plate 37. That is, two pairs of drive coils 38, 38, ... are provided, and each pair of drive coils 38, 38, ... are electrically connected to each other.

The wiring plate 37 is connected to a power source circuit (not shown), and a drive current is supplied from the power source circuit to the drive coils 38, 38, ... via the wiring plate 37.

An optical element 39 is inserted from the front side into the element holding portion 35 of the holder 32 for fixation (see FIGS. 14 and 15). The optical element 39 may be a lens, a lens group, or an imaging element such as a charge coupled device (CCD) or a complementary metal oxide semiconductor (CMOS). The optical element 39 is fixed to the element holding portion 35 by bonding or the like to be held by the holder 32.

Figure 7:
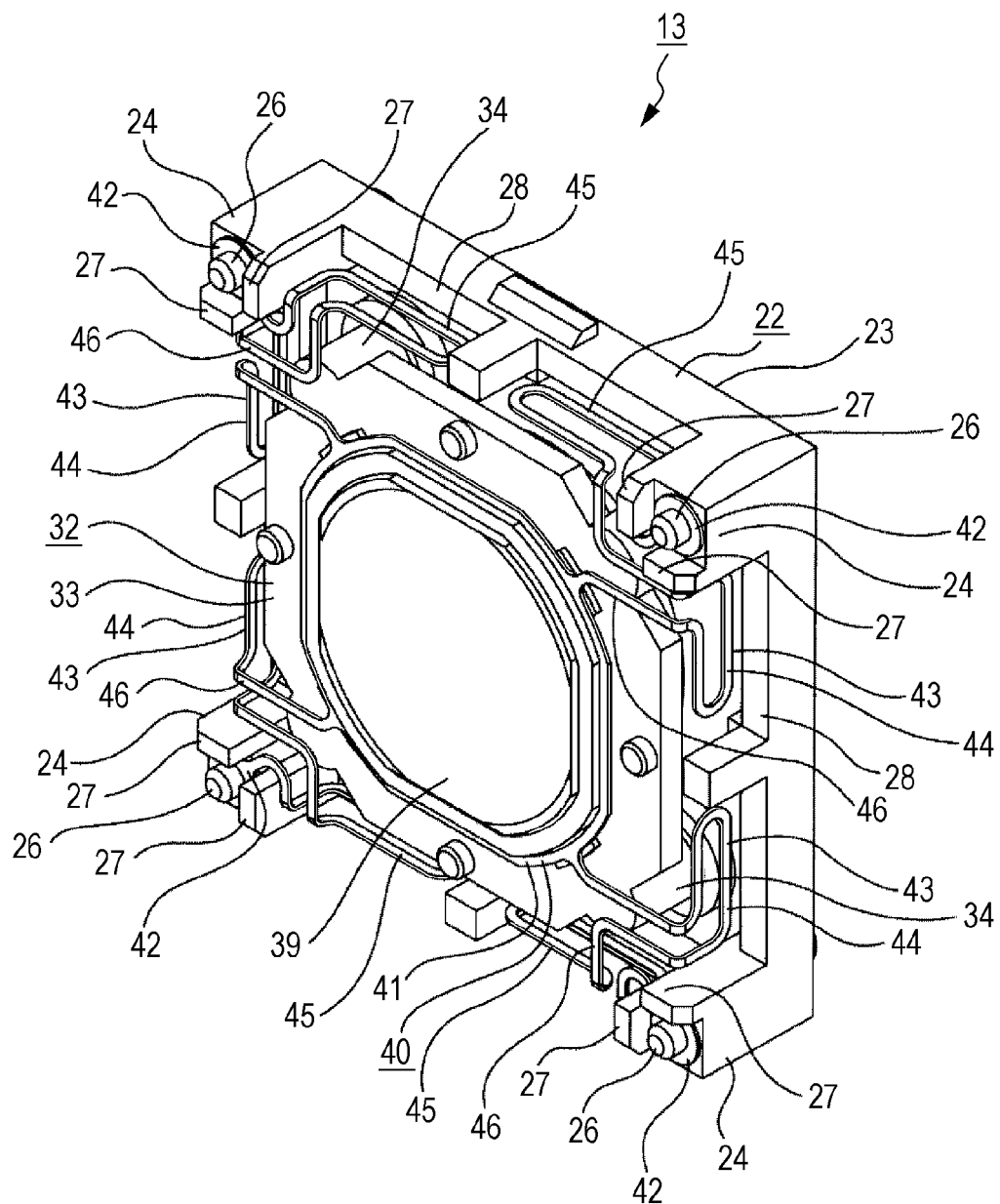
FIG. 7 is an enlarged perspective view of the blur correction device.
Figure 8:
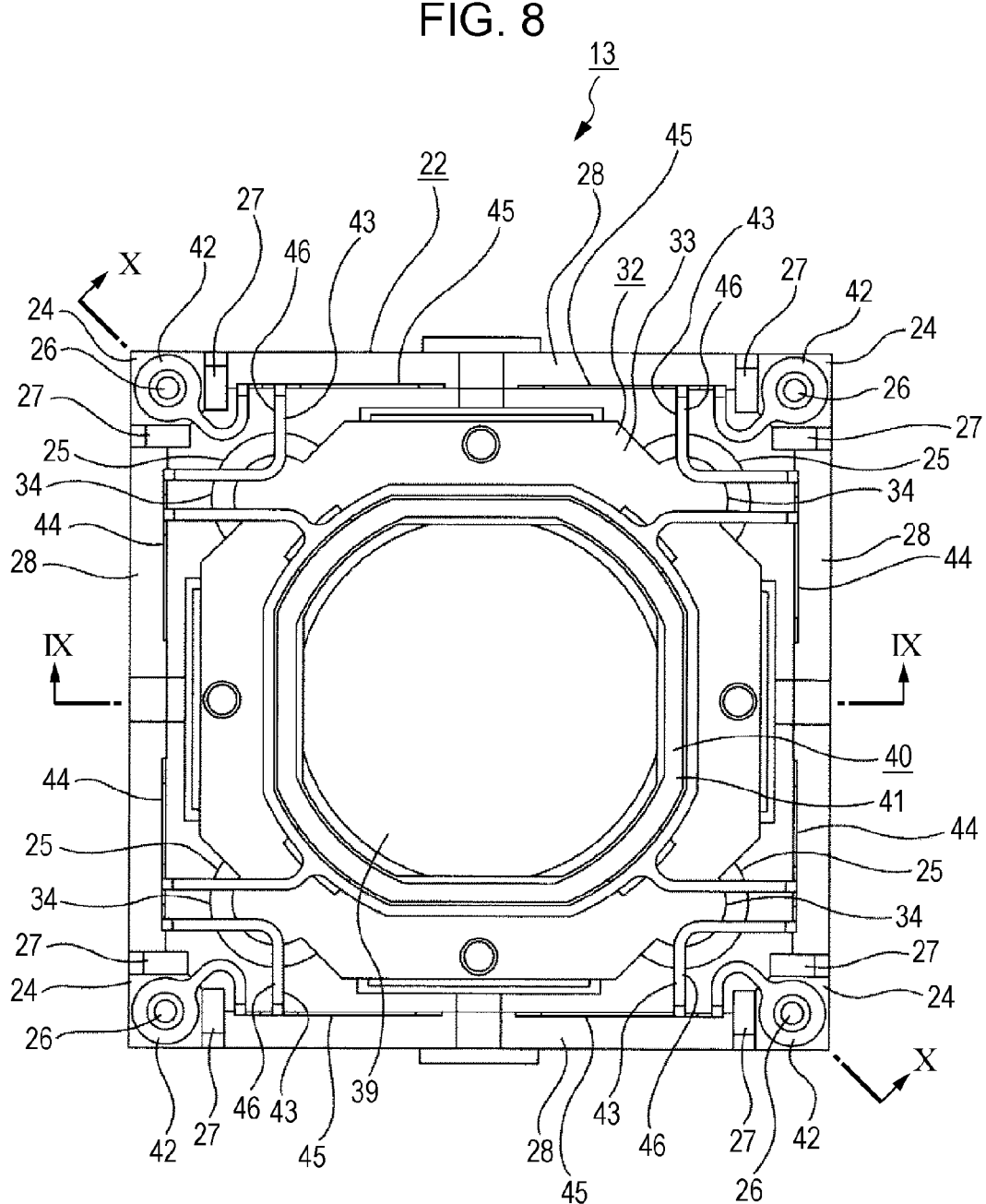
FIG. 8 is an enlarged plan view of the blur correction device.
Figure 16:
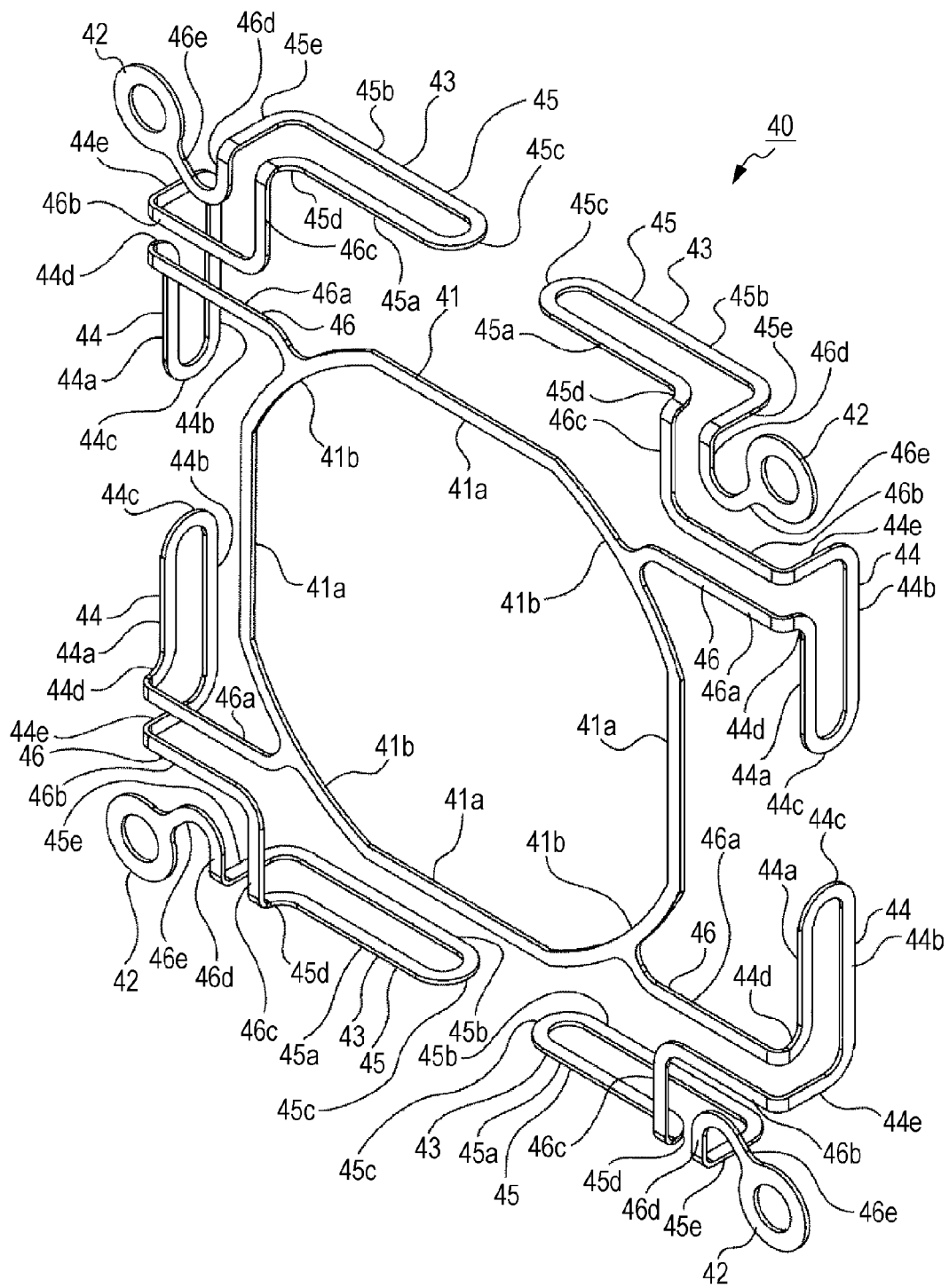
FIG. 16 is an enlarged perspective view of a plate spring.
Figure 17:
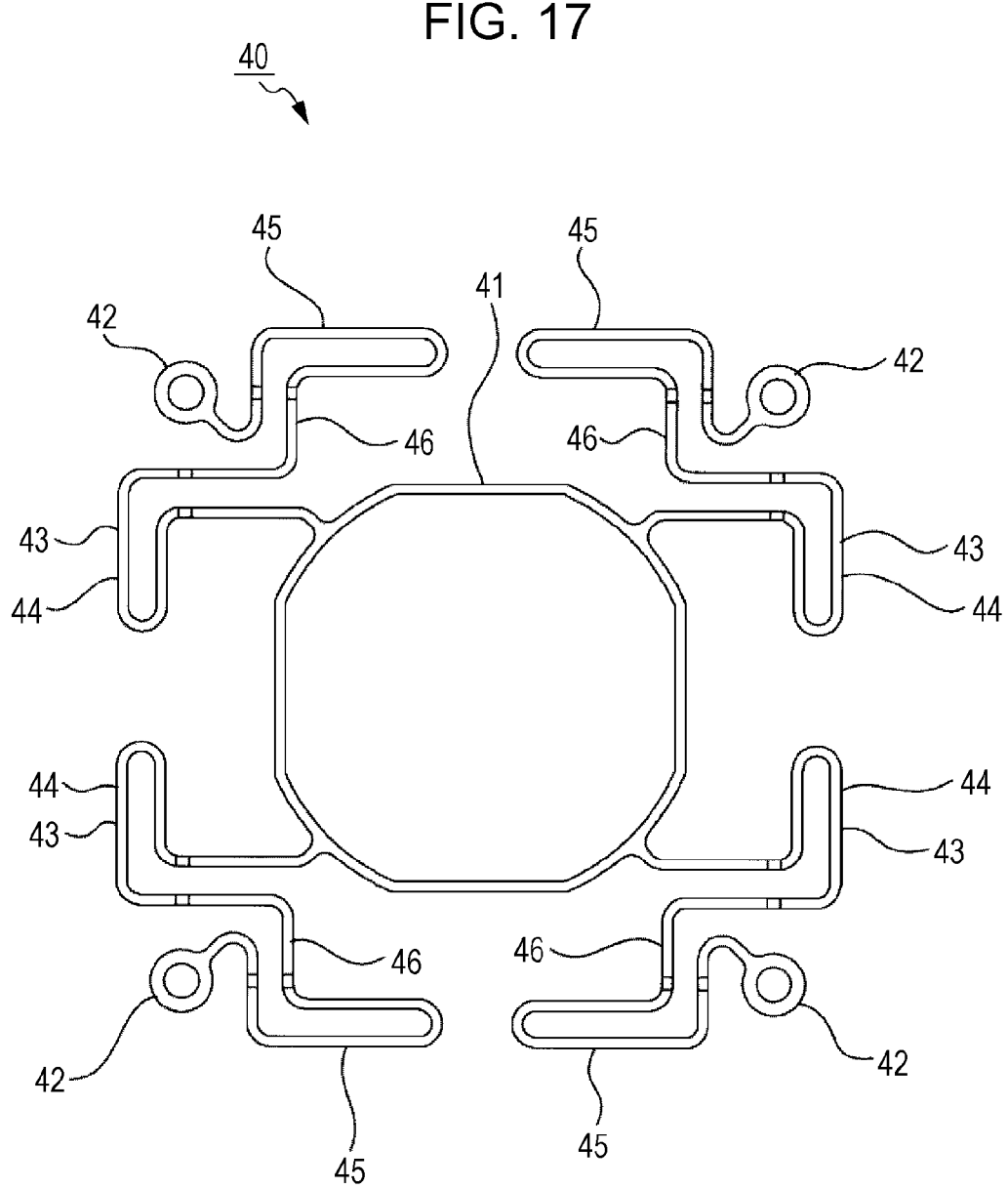
FIG. 17 is an enlarged development view of the plate spring.

The base body 22 and the holder 32 are coupled to each other by a plate spring 40 (see FIGS. 7 and 8). Various portions of the plate spring 40 are formed integrally with each other. As shown in FIGS. 16 and 17, the plate spring 40 includes a first link portion 41, four second link portions 42, 42, ..., and four deformable portions 43, 43, ... provided between the first link portion 41 and the four second link portions 42, 42, .... The plate spring 40 is formed by folding certain parts with respect to other parts (see FIG. 16). FIG. 17 shows the plate spring 40 in a state before the certain parts are folded.

The plate spring 40 is configured such that its portions other than the folded portions are oriented in the front-rear direction (optical axis direction), and such that the folded portions are oriented in the left-right direction or the up-down direction.

The first link portion 41 is formed in the shape of an annulus oriented in the front-rear direction. The first link portion 41 is formed in generally the same shape as the shape of the upright wall portion 33a provided on the spring attachment portion 33 of the holder 32, and has a size slightly larger than the size of the upright wall portion 33a.

The first link portion 41 includes four first portions 41a, 41a, ... extending in the up-down direction or the left-right direction, and four second portions 41b, 41b, ... positioned between the first portions 41a, 41a, ... and formed in a gentle arcuate shape.

The second link portion 42 is formed in a ring shape, and positioned on the outer side of the first link portion 41 in a spaced manner at equal intervals in the circumferential direction.

The deformable portions 43, 43, ... are continuous with the center portions of the second portions 41b, 41b, ... of the first link portion 41, and are provided at point-symmetric positions about the optical axis of the optical element 39 (center of the first link portion 41).

The deformable portion 43 includes a first urging portion 44 oriented in the left-right direction, a second urging portion 45 oriented in the up-down direction, and a third urging portion 46 oriented in the front-rear direction. The first urging portion 44 and the second urging portion 45 are each formed by folding the outermost portion of the deformable portion 43 by an angle of 90° with respect to the third urging portion 46.

The first urging portion 44 includes a first straight portion 44a extending in the up-down direction, a second straight portion 44b positioned on the rear side of the first straight portion 44a and extending in the up-down direction, a semi-arcuate bent portion 44c that couples one end of the first straight portion 44a and one end of the second straight portion 44b to each other, a first coupling portion 44d projecting forward from the other end of the first straight portion 44a, and a second coupling portion 44e projecting forward from the other end of the second straight portion 44b. The first coupling portion 44d is shorter than the second coupling portion 44e. The front ends of the first coupling portion 44d and the second coupling portion 44e are at the same position in the front-rear direction.

The second urging portion 45 includes a first straight portion 45a extending in the left-right direction, a second straight portion 45b positioned on the rear side of the first straight portion 45a and extending in the left-right direction, a semi-arcuate bent portion 45c that couples one end of the first straight portion 45a and one end of the second straight portion 45b to each other, a first coupling portion 45d projecting forward from the other end of the first straight portion 45a, and a second coupling portion 45e projecting forward from the other end of the second straight portion 45b. The first coupling portion 45d is shorter than the second coupling portion 45e. The front ends of the first coupling portion 45d and the second coupling portion 45e are at the same position in the front-rear direction.

The third urging portion 46 includes a first straight portion 46a that couples the center portion of the second portion 41b of the first link portion 41 and the front end of the first coupling portion 44d to each other and that extends in the left-right direction, a second straight portion 46b positioned on the outer side of the first straight portion 46a and extending in the left-right direction, one end of the second straight portion 46b being continuous with the front end of the second coupling portion 44e, a third straight portion 46c extending in the up-down direction, both ends of the third straight portion 46c being continuous with the other end of the second straight portion 46b and the front end of the first coupling portion 45d, respectively, a fourth straight portion 46d positioned on the outer side of the third straight portion 46c and extending in the up-down direction, one of the fourth straight portion 46d being continuous with the front end of the second coupling portion 45e, and a generally arcuate bent portion 46e that couples the other end of the fourth straight portion 46d and the second link portion 42 to each other.

As shown in FIGS. 7 and 8, the plate spring 40 is attached to the holder 32 by bonding or the like with the first link portion 41 contacting the spring reception portions 33b, 33b, ... on the outer side of the upright wall portion 33a, and attached to the base body 22 with the second link portions 42, 42, ... contacting the spring reception surfaces 24a, 24a, ... of the column portion 24, 24, ... and fitted with the positioning pins 26, 26, ....

With the first link portion 41 of the plate spring 40 attached to the holder 32 and the second link portions 42, 42, ... of the plate spring 40 attached to the base body 22 so that the base body 22 and the holder 32 are coupled to each other by the plate spring 40 as described above, the holder 32 to which various components are fixed is supported by the base body 22 to which various components are fixed as follows to form the blur correction device 13 (see FIGS. 9 and 10).

The holder 32, to which the coil body 36 and the optical element 39 are fixed, is supported by the base body 22, to which the yoke 29 is fixed and in which the ball members 31, 31, ... are disposed in the ball reception portions 25a, 25a, ..., so as to be movable in a direction orthogonal to the optical axis direction of the optical element 39 (front-rear direction). The holder 32, which is supported by the base body 22, is urged rearward by the third urging portions 46, 46, ... of the plate spring 40 so that the ball contact surfaces 34a, 34a, . . . of the positioning projecting portions 34, 34, . . . are pressed against the ball members 31, 31, . . . (see FIG. 10).

With the holder 32 thus pressed against the ball members 31, 31, . . . by the plate spring 40, the ball members 31, 31, . . . are rolled when the holder 32 is moved with respect to the base body 22 in a direction orthogonal to the optical axis direction, allowing the holder 32 to be smoothly moved with respect to the base body 22.

With the holder 32 supported by the base body 22 as described above, the drive coils 38, 38, . . . and the drive magnets 30, 30, . . . are positioned opposite each other in the front-rear direction (see FIG. 9).

Figure 18:
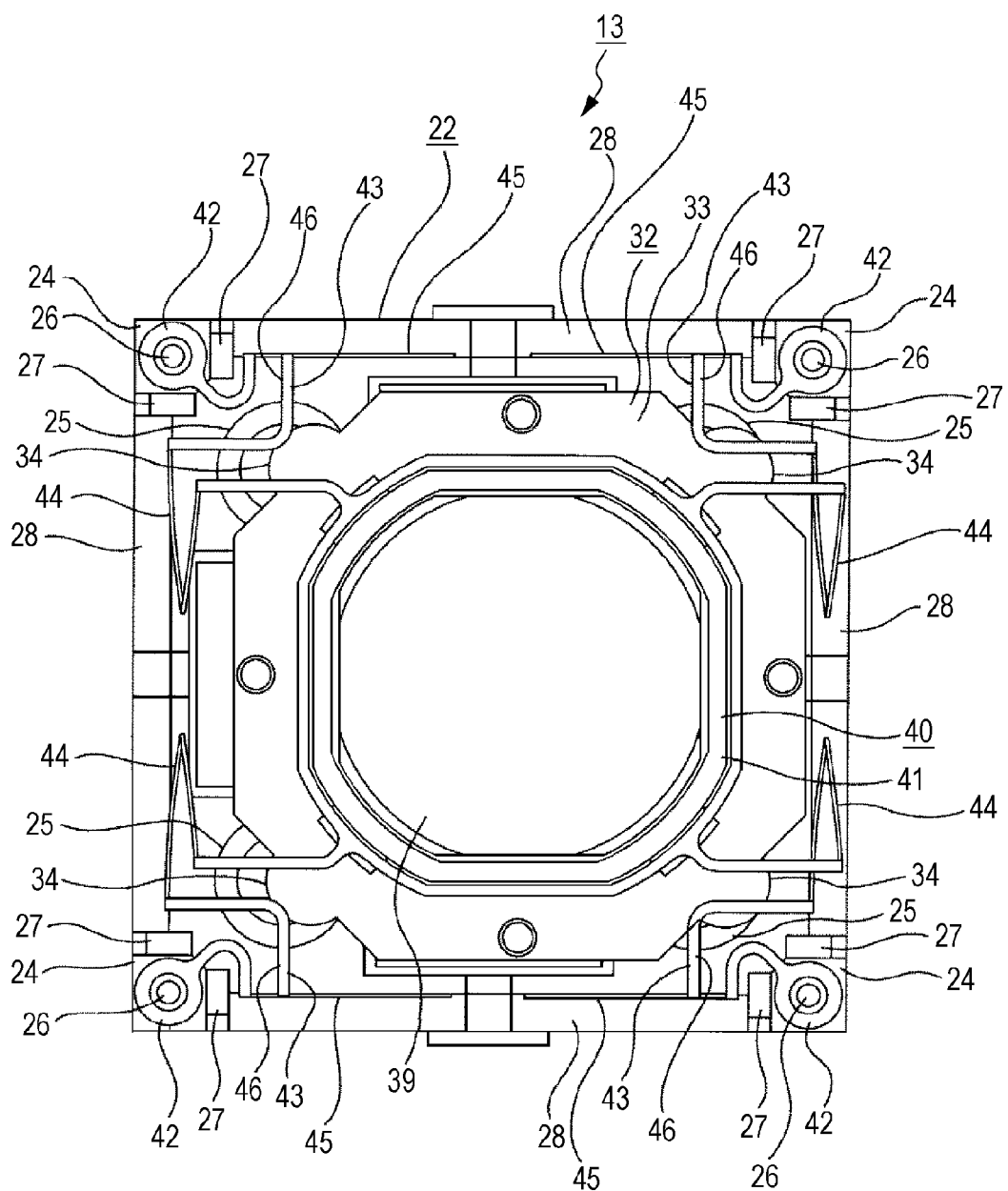
FIG. 18 is an enlarged front view showing a state in which the holder is moved in a first direction orthogonal to the optical axis direction.

When a drive current is supplied from the power source circuit to a pair of drive coils 38, 38 via the wiring plate 37, a thrust in a predetermined direction is generated because of the relationship with a magnetic field generated in the drive magnets 30, 30 opposite the drive coils 38, 38. The generated thrust moves the holder 32 holding the optical element 39 with respect to the base body 22 in a direction (X direction) orthogonal to the optical axis direction, that is, leftward or rightward, depending on the direction of the drive current (see FIG. 18). At this time, mainly the second urging portions 45, 45, . . . of the plate spring 40 are elastically deformed in the X direction. When supply of the drive current to the drive coils 38, 38 is stopped, the elastic deformation of the plate spring 40 is released to return to the holder 32 to its original position with respect to the base body 22.

Figure 19:
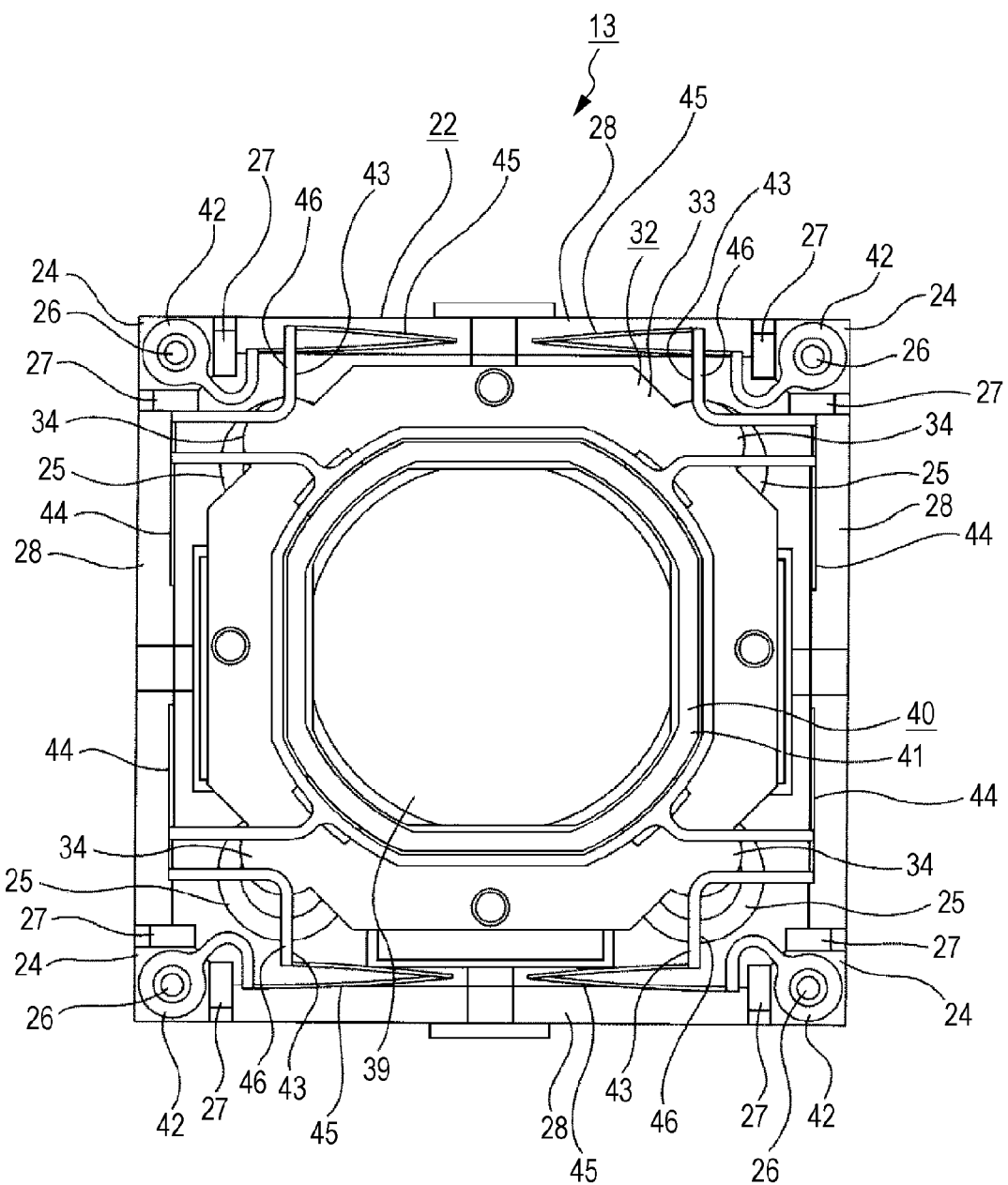
FIG. 19 is an enlarged front view showing a state in which the holder is moved in a second direction orthogonal to the optical axis direction.

When a drive current is supplied from the power source circuit to the other pair of drive coils 38, 38 via the wiring plate 37, a thrust in a predetermined direction is generated because of the relationship with a magnetic field generated in the drive magnets 30, 30 opposite the drive coils 38, 38. The generated thrust moves the holder 32 holding the optical element 39 with respect to the base body 22 in a direction (Y direction) orthogonal to the optical axis direction and orthogonal to the X direction, that is, upward or downward, depending on the direction of the drive current (see FIG. 19). At this time, mainly the third urging portions 46, 46, . . . of the plate spring 40 are elastically deformed in the Y direction. When supply of the drive current to the drive coils 38, 38 is stopped, the elastic deformation of the plate spring 40 is released to return to the holder 32 to its original position with respect to the base body 22.

When the optical element 39 is moved along with movement of the holder 32 as described above, a blur correction operation is activated to correct blur generated when the imaging apparatus 1 is shaken.

The drive magnets 30, 30, . . . and the drive coils 38, 38, . . . function as a drive section that moves the holder 32 holding the optical element 39 in a direction orthogonal to the optical axis direction as described above. With the drive magnets 30, 30, . . . and the drive coils 38, 38, . . . thus used as the drive section, a large drive force may be secured with a simple configuration, improving the reliability of the blur correction operation.

In the blur correction device 13, two pairs of drive magnets 30, 30, . . . and two pairs of drive coils 38, 38, . . . are disposed at positions opposite each other across the optical axis of the optical element 39 and at the same distance from the optical axis.

Thus, a maximum drive force is applied to the center of the optical element 39, allowing the holder 32 to be moved stably with respect to the base body 22 in a well-balanced manner.

With two pairs of drive magnets 30, 30, . . . and two pairs of drive coils 38, 38, . . . disposed at positions opposite each other across the optical axis of the optical element 39 and at the same distance from the optical axis, generation of a rotational moment may be suppressed.

Further, even in the case where the holder 32 is rolled by a rotational moment generated because of a shift in magnetic balance or the like, such rolling is suppressed by the elasticity of the plate spring 40 holding the holder 32, improving the positional accuracy of the holder 32.

Figure 20:
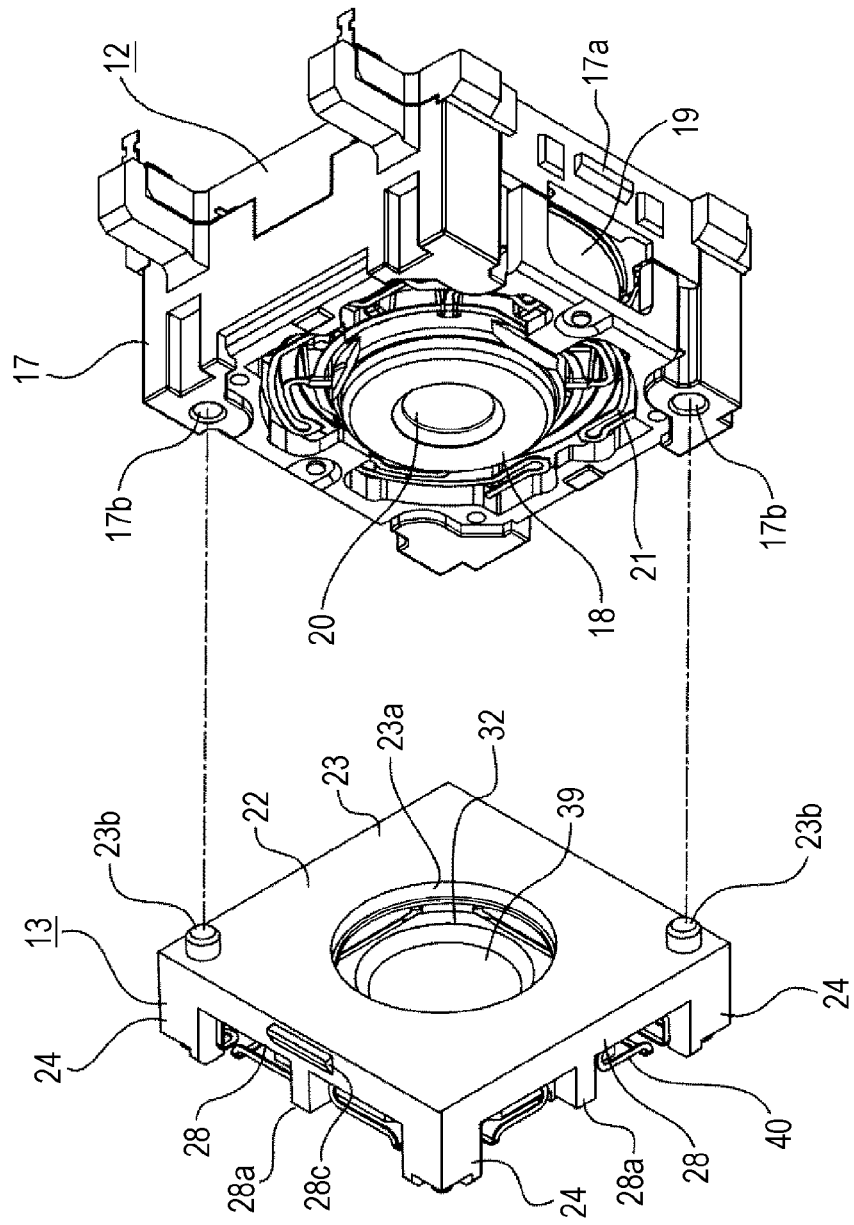
FIG. 20 is an enlarged perspective view showing the camera module and the blur correction device as exploded.

The blur correction device 13 configured as described above is linked to the camera module 12 with the fitting pins 23b, 23b, which are provided on the lower surface of the base body 22, fitted into the fitting holes 17b, 17b of the case 17 (see FIG. 20).

When the blur correction device 13 is linked to the camera module 12, the cover 11 is linked to the camera module 12 and the blur correction device 13 (see FIG. 3). The cover 11 is linked to the camera module 12 and the blur correction device 13 with the link projecting portions 17a, 17a of the case 17 fitted into the link holes 15a, 15a of the first link surface portion 15 and with the link projecting portions 28c, 28c of the base body 22 fitted into the link holes 16a, 16a of the second link surface portion 16.

With the cover 11 linked to the blur correction device 13, the cover surface portion 14 is positioned in contact with or in proximity to the cover reception surfaces 27a, 27a, . . . of the ribs 27, 27, . . . provided on the base body 22.

[Dimensional Relationship Among Various Components]

Figure 21:
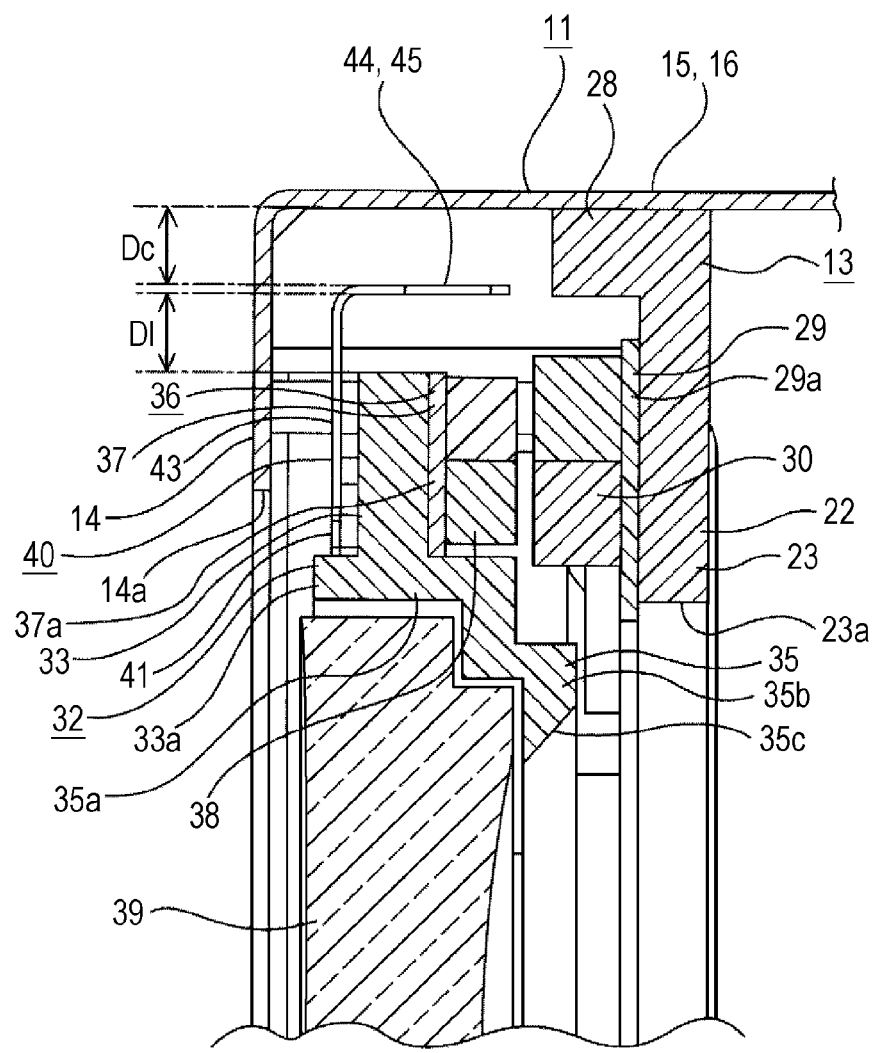
FIG. 21 is an enlarged cross-sectional view showing the dimensional relationship among various components of the blur correction device.

Next, the dimensional relationship among various components will be described (see FIGS. 21 to 23).

The distance of maximum movement assumed to occur when the blur correction device 13 performs the blur correction operation is defined as Ds (not shown). As shown in FIG. 21, the distance between the outer peripheral surface of the holder 32 and the first urging portion 44 and the second urging portion 45 of the plate spring 40 is defined as Dl, and the distance between the first urging portion 44 and the second urging portion 45 and the first link surface portion 15 and the second link surface portion 16 of the cover 11 is defined as Dc. Then, formulas Ds<Dl and Ds<Dc are met.

Thus, when the blur correction device 13 performs the blur correction operation, the first urging portion 44 and the second urging portion 45 do not contact the holder 32, or the first urging portion 44 and the second urging portion 45 do not contact the cover 11, improving the reliability and the accuracy of the blur correction operation.

Figure 22:
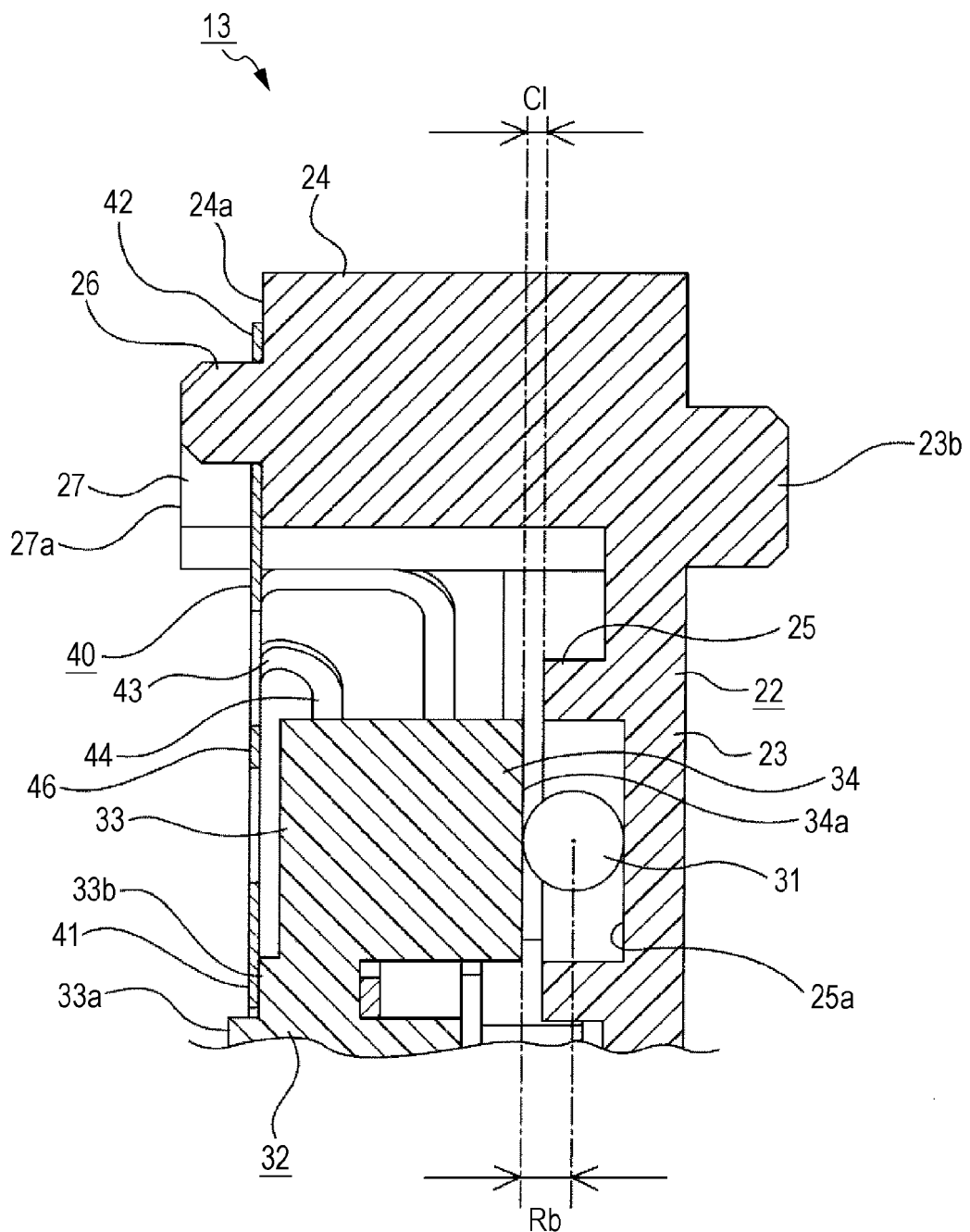
FIG. 22 is an enlarged cross-sectional view showing the dimensional relationship among various other components of the blur correction device.
Figure 23:
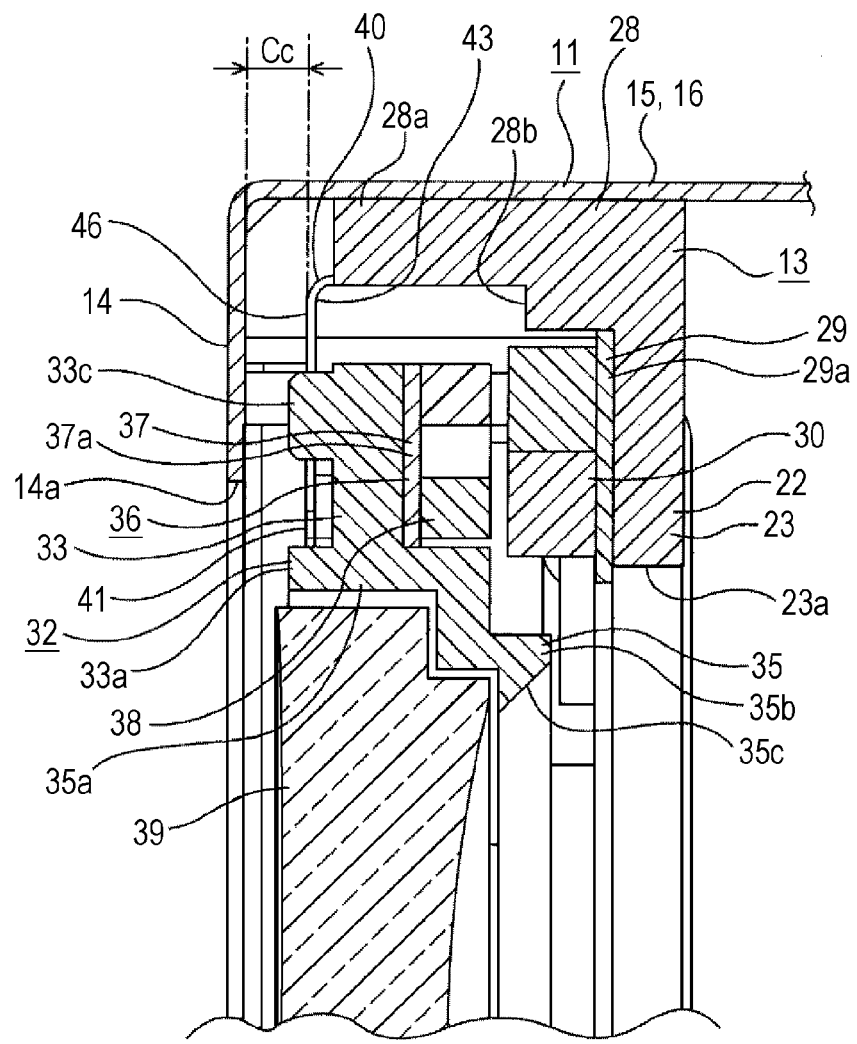
FIG. 23 is an enlarged cross-sectional view showing the dimensional relationship among various still other components of the blur correction device.

As shown in FIG. 22, the radius of the ball member 31 is defined as Rb, and the distance between the ball contact surface 34a of the holder 32 and the front surface of the ball member restriction portion 25 of the base body 22 is defined as Cl. As shown in FIG. 23, the distance between the cover surface portion 14 of the cover 11 and the front surface of the reception pin 33c of the holder 32 is defined as Cc. Then, a formula Rb<Cl+Cc is met.

Thus, even in the case where large vibration is generated in the blur correction device 13 because of an impact on the imaging apparatus 1 or a fall of the imaging apparatus 1, the ball members 31, 31, . . . do not climb over the ball member restriction portions 25, 25, . . . to slip out of the ball member restriction portions 25, 25, . . . , securing a smooth operation state of the blur correction device 13 at all times.

When a large impact is caused on the holder 32 to deform the holder 32, the holder 32 is received by the restriction projecting portions 28a, 28a, . . . provided on the base body 22, suppressing deformation of the holder 32.

[Folding Angle of Plate Spring]

Figure 24:
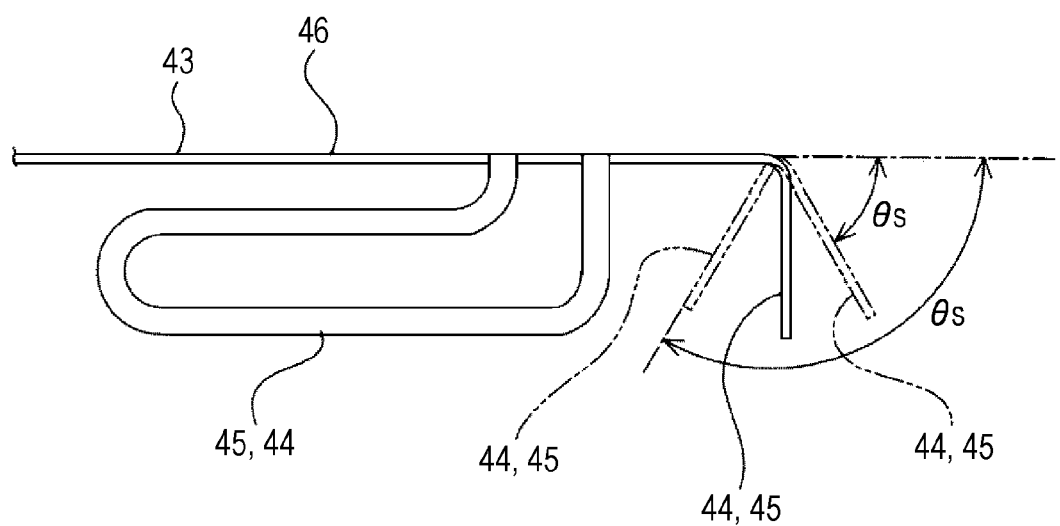
FIG. 24 is a conceptual diagram illustrating the folding angle of the plate spring.

The folding angle of the first urging portions 44, 44, . . . and the second urging portions 45, 45, . . . of the plate spring 40 will be described below (see FIG. 24).

In the plate spring 40 according to the example described above, the first urging portion 44 and the second urging portion 45 are folded by an angle of 90° with respect to other portions. However, the folding angle θs of the first urging portion 44 and the second urging portion 45 is not limited to an angle of 90°. The folding angle θs may be set as desired as long as 0°<θs<180° is met.

When the folding angle θs of the first urging portion 44 and the second urging portion 45 is set as desired, the spring constant of the plate spring 40 is varied in accordance with the folding angle θs. This makes it possible to adjust as desired the holding force of the plate spring 40 for the holder 32 in a direction orthogonal to the optical axis direction and the urging force of the plate spring 40 for the holder 32 in the optical axis direction.

The total weight of the movable portion of the blur correction device, that is, the holder 32, the optical element 39, and the coil body 36, is defined as M. Then, the eigenfrequencies in the X direction and the Y direction are represented by $½π·\sqrt{(2Kx/M)}$ and $½π·\sqrt{(2Ky/M)}$, respectively. The spring constants Kx, Ky are mainly decided in accordance with the shape of the first urging portion 44 and the second urging portion 45. Therefore, even in the case where oscillation is generated, such oscillation may be suppressed by changing the shape of the plate spring 40 to set Kx, Ky as desired.

[Assembly Procedures of Blur Correction Device]

The assembly procedures of the blur correction device 13 will be described below (see FIGS. 25 to 35).

Figure 25:
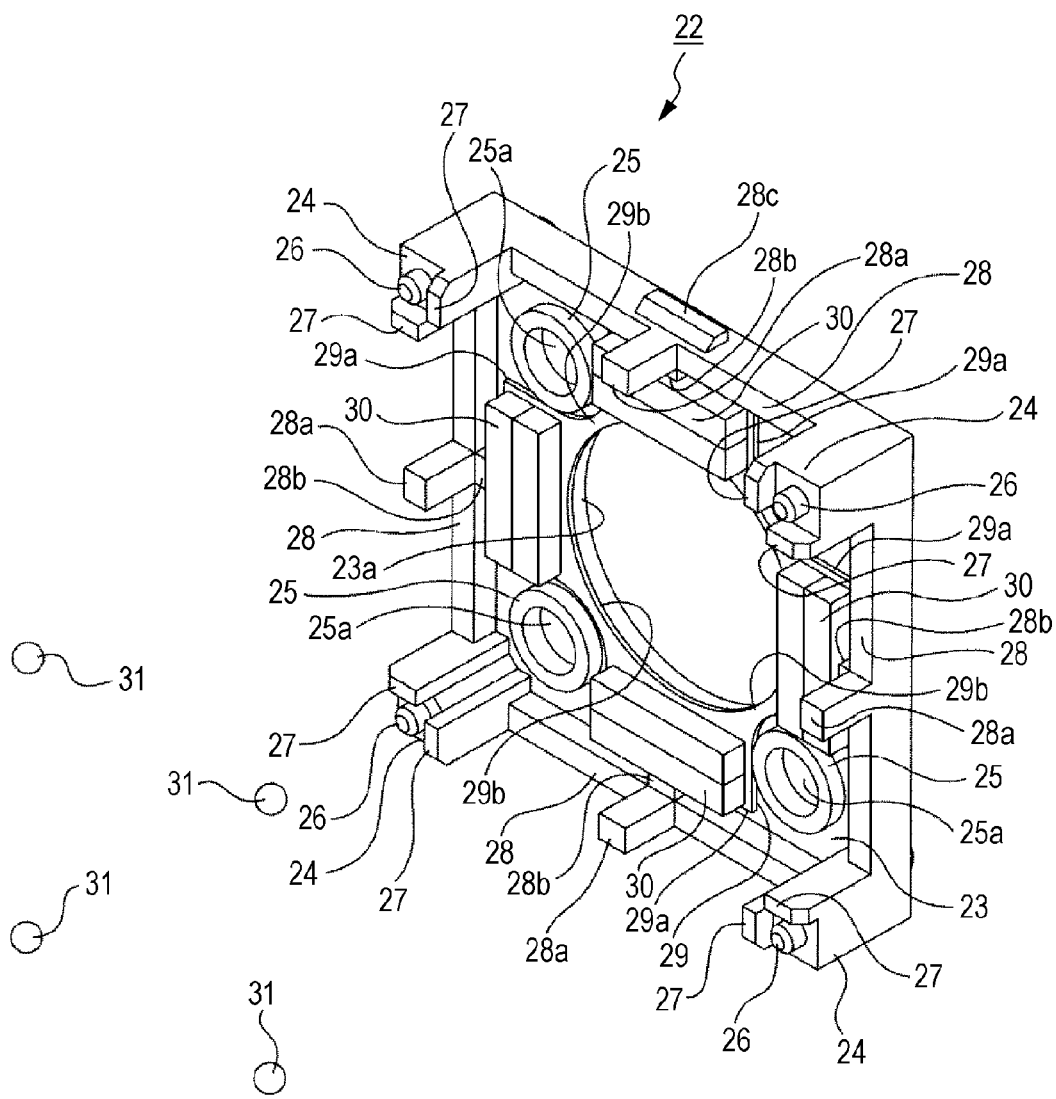
FIG. 25 shows the assembly procedures of the blur correction device in conjunction with FIGS. 26 to 35, FIG. 25 being an enlarged perspective view showing a state in which the yoke is fixed to the base body.

First, the yoke 29 to which the drive magnets 30, 30, . . . are fixed is fixed to the base body 22 by bonding or the like (see FIG. 25). At this time, the yoke 29 and the drive magnets 30, 30, . . . are positioned with respect to the base body 22 with the outer side surfaces of the drive magnets 30, 30, . . . contacted by the positioning projecting portions 28b, 28b, . . . provided on the base body 22.

Figure 26:
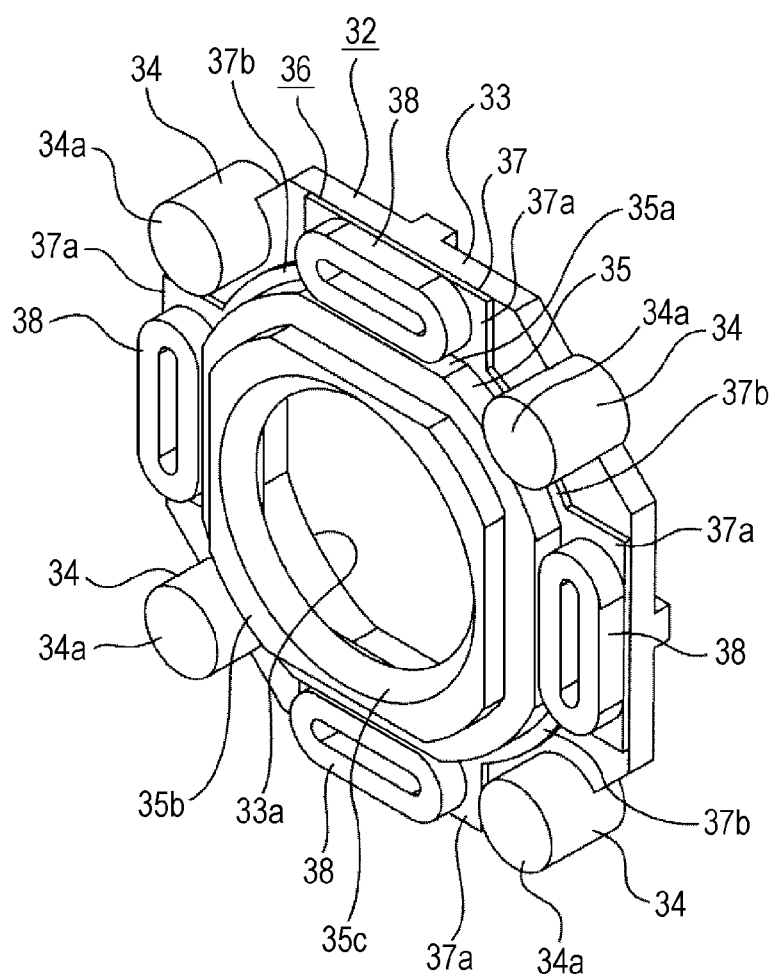
FIG. 26 is an enlarged perspective view showing a state in which the coil body is fixed to the holder.
Figure 27:
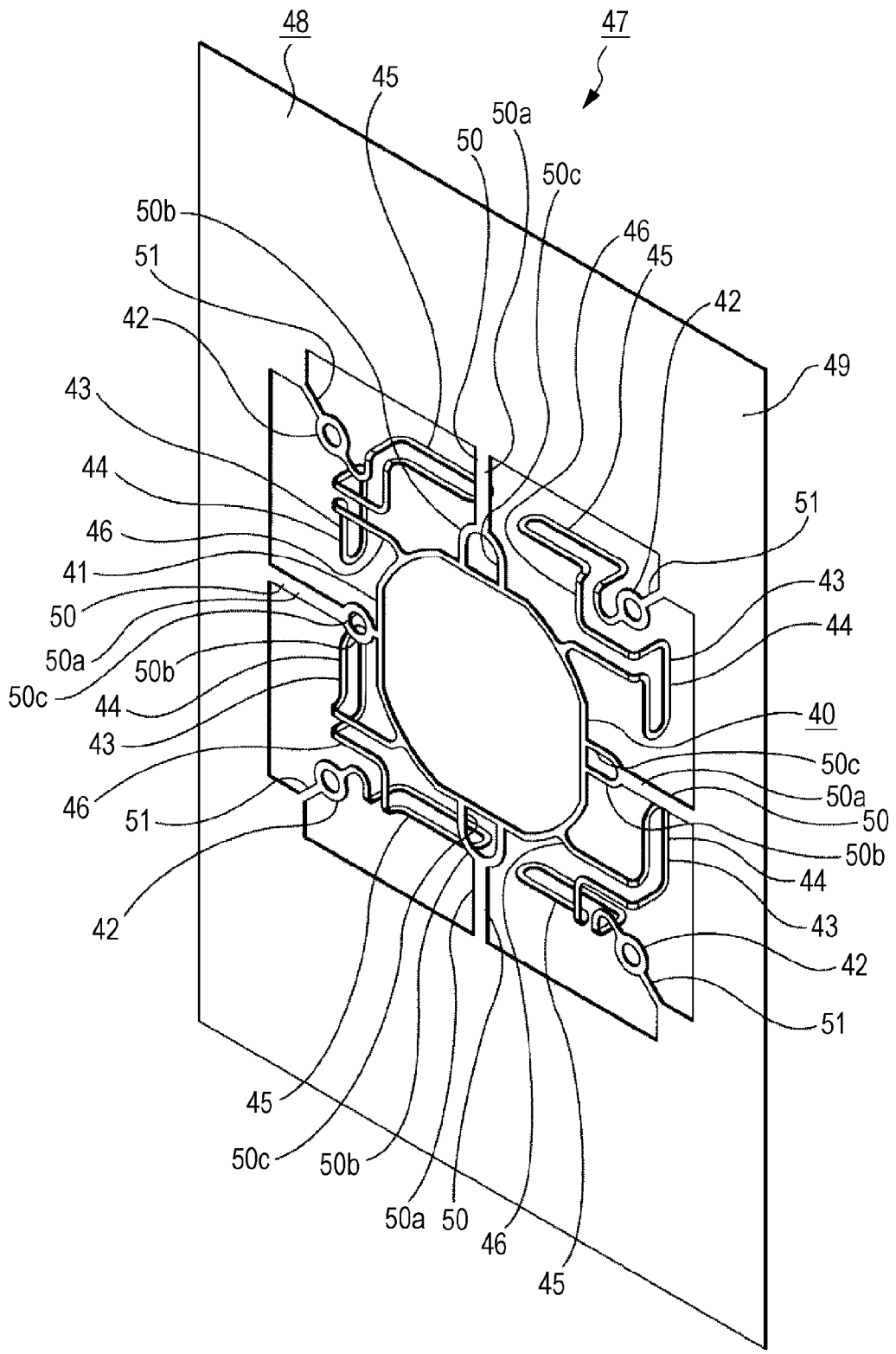
FIG. 27 is an enlarged perspective view showing a frame member.

Next, the coil body 36 is fixed to the holder 32 by bonding or the like (see FIG. 26). At this time, the coil body 36 is positioned with respect to the holder 32 with the wiring plate 37 fitted with the peripheral wall portion 35a of the element holding portion 35. The optical element 39 has been fixed in advance to the element holding portion 35 of the holder 32 by bonding or the like.

Next, the plate spring 40 is coupled to the holder 32. The plate spring 40 is coupled to the holder 32 using a frame member 47 (see FIG. 27).

The frame member 47 is a plate-like member which is oriented in the front-rear direction and in which the plate spring 40 and a spring support frame 48 are formed integrally with each other. The spring support frame 48 is continuous with the plate spring 40 on the outer side of the plate spring 40, and includes an outer frame portion 49, four first coupling piece portions 50, 50, . . . projecting inward from the inner peripheral edge of the outer frame portion 49, and four second coupling piece portions 51, 51, . . . also projecting inward from the inner peripheral edge of the outer frame portion 49.

The first coupling piece portions 50, 50, . . . are continuous with the center portions of the first portions 41a, 41a, . . . of the first link portion 41. The first coupling piece portion 50 includes a straight portion 50a continuous with the outer frame portion 49, and an alignment portion 50b continuous with the straight portion 50a and the first link portion 41. A pin insertion hole 50c is formed in the alignment portion 50b.

The second coupling piece portions 51, 51, . . . are continuous with the second link portions 42, 42, . . . .

In the frame member 47, the first urging portions 44, 44, . . . and the second urging portions 45, 45, . . . of the plate spring 40 have been folded in advance by an angle of 90° with respect to other portions.

Figure 28:
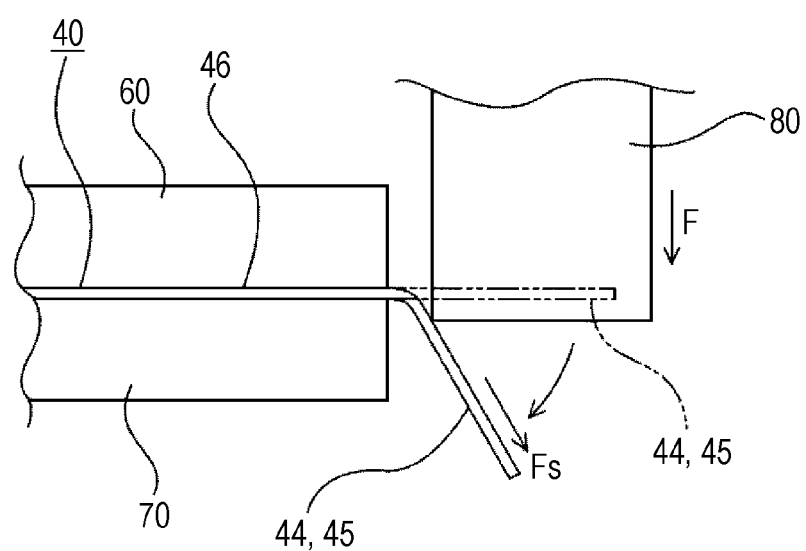
FIG. 28 is a conceptual diagram showing a state in which a part of the plate spring is folded.

As shown in FIG. 28, the folding of the first urging portion 44 and the second urging portion 45 is performed by pressing the other portions using pressing dies 60, 70 to hold the other portions between the pressing dies 60, 70, and pressing the first urging portion 44 and the second urging portion 45 using a bending die 80.

At this time, a force F applied from the bending die 80 to the first urging portion 44 and the second urging portion 45 applies a tensile force Fs to the first urging portion 44 and the second urging portion 45. The frame member 47 is provided with the first coupling piece portions 50, 50, . . . , which are continuous with the first link portion 41, and the second coupling piece portions 51, 51, . . . , which are continuous with the second link portions 42, 42, . . . . Thus, the first link portion 41 and the second link portions 42, 42, . . . are held by the first coupling piece portions 50, 50, . . . and the second coupling piece portions 51, 51, . . . , respectively, suppressing deformation of the plate spring 40 due to the tensile force Fs.

Figure 29:
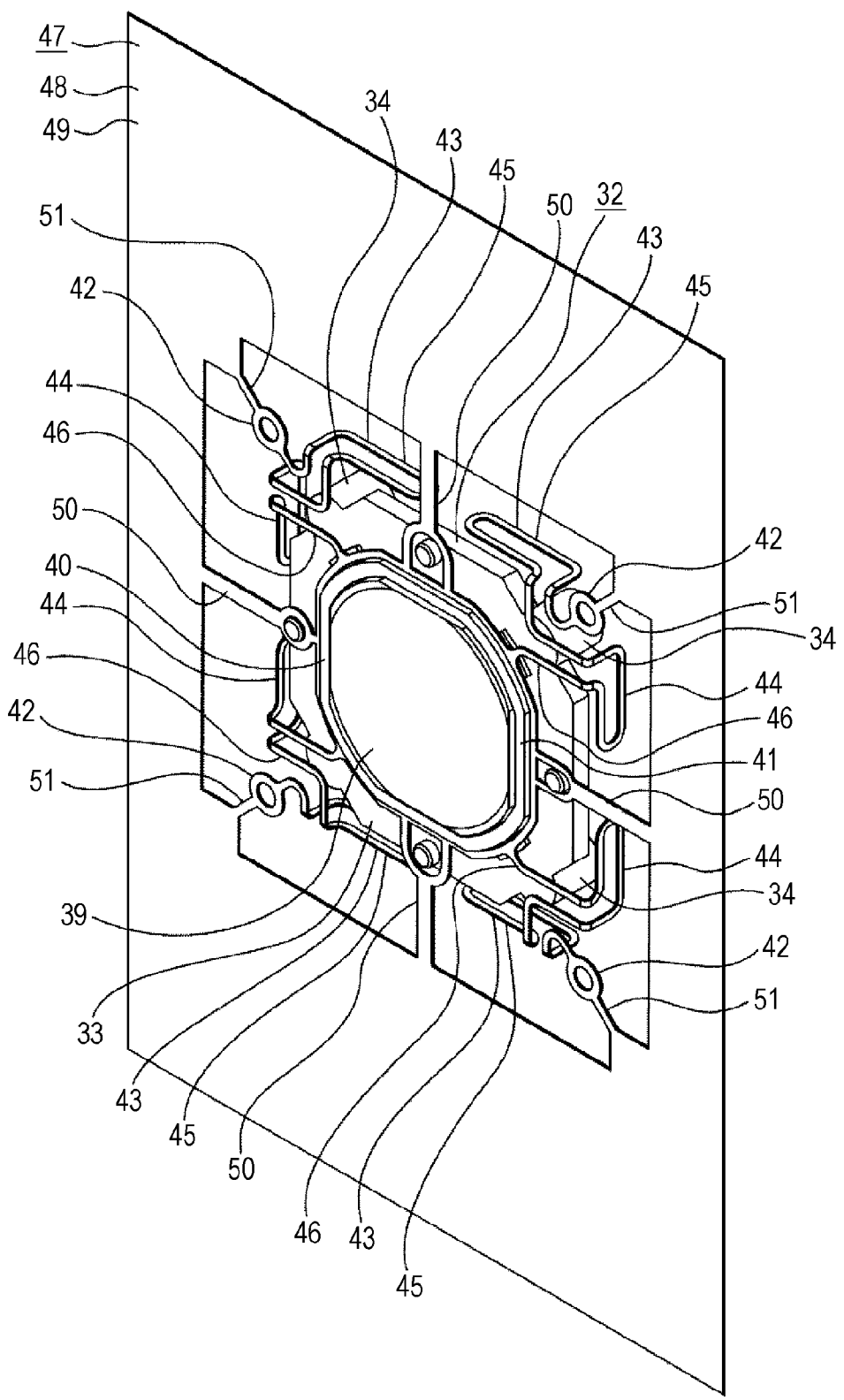
FIG. 29 is an enlarged perspective view showing a state in which the frame member is assembled to the holder.
Figure 30:
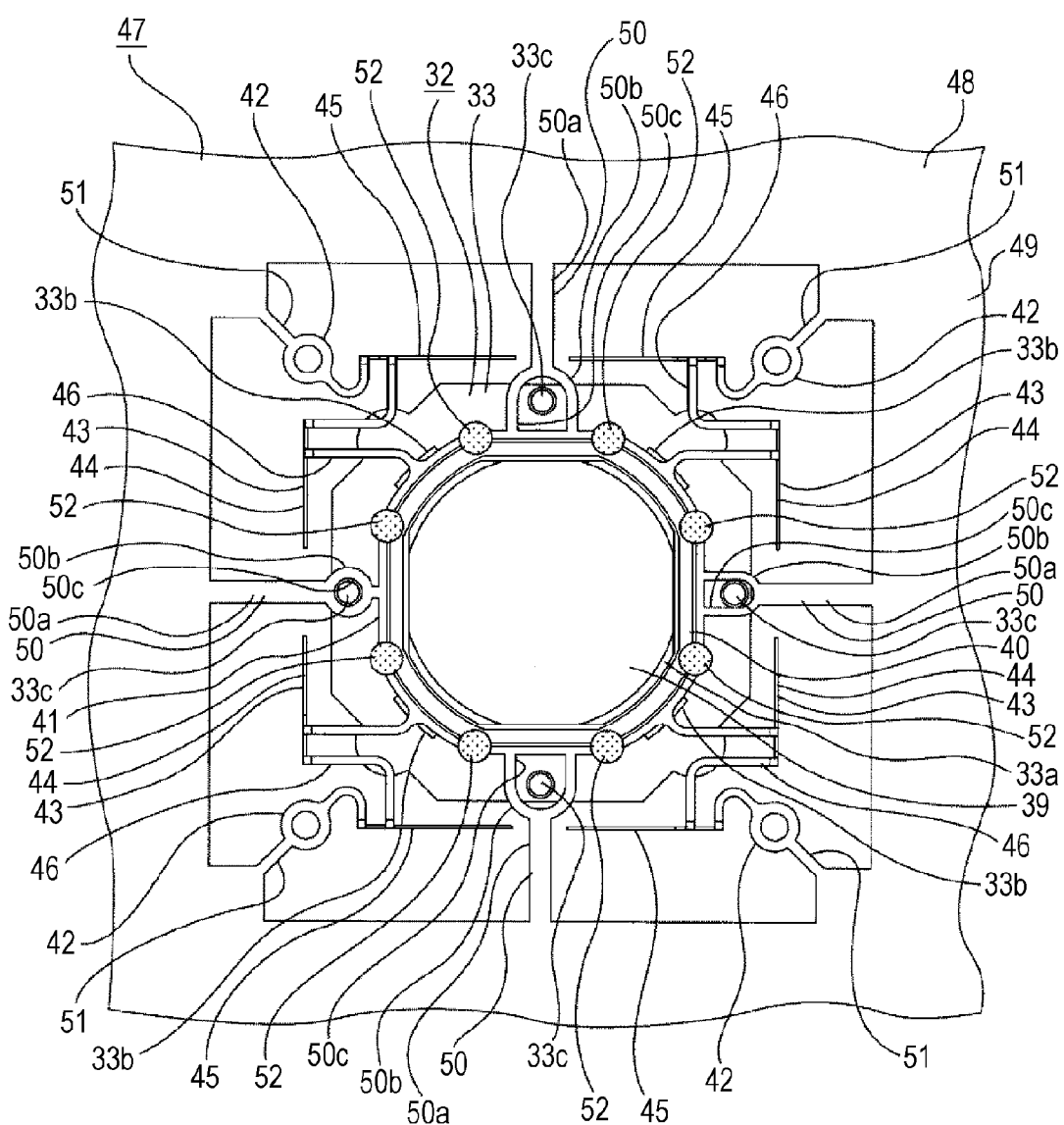
FIG. 30 is an enlarged front view showing a state in which the frame member is fixed to the holder using an adhesive.

The holder 32 is assembled to the frame member 47 (see FIG. 29). The assembly of the frame member 47 to the holder 32 is performed by inserting the reception pins 33c, 33c, . . . of the holder 32 into the pin insertion holes 50c, 50c, . . . formed in the alignment portions 50b, 50b, . . . of the first coupling piece portions 50, 50, . . . . The plate spring 40 is positioned with respect to the holder 32 in a direction orthogonal to the optical axis direction by inserting the reception pins 33c, 33c, . . . of the holder 32 into the pin insertion holes 50c, 50c, . . . .

The plate spring 40 is thus positioned with respect to the holder 32 in a direction orthogonal to the optical axis direction by inserting the reception pins 33c, 33c, . . . into the pin insertion holes 50c, 50c, . . . formed in the alignment portions 50b, 50b, . . . of the spring support frame 48 formed integrally with the plate spring 40.

In the frame member 47, the plate spring 40 and the first coupling piece portions 50, 50, . . . are formed integrally with each other. This enhances the positional accuracy of the plate spring 40 and the first coupling piece portions 50, 50, . . . , improving the positional accuracy of the plate spring 40 with respect to the holder 32.

With the frame member 47 assembled to the holder 32 as described above, the first link portion 41 is in contact with the spring reception portions 33b, 33b, . . . on the outer side of the upright wall portion 33a, and predetermined portions of the first link portion 41 are fixed to the holder 32 by adhesives 52, 52, . . . (see FIG. 30).

In the base body 22, as described above, the spring reception surfaces 24a, 24a, . . . of the column portions 24, 24, . . . are positioned forward of the front surfaces of the restriction projecting portions 28a, 28a, . . . , preventing contact of the frame member 47 with the restriction projecting portions 28a, 28a, . . . during assembly of the frame member 47 to the holder 32.

Next, the ball members 31, 31, . . . are inserted into the ball reception portions 25a, 25a, . . . of the base body 22 to be disposed in the ball reception portions 25a, 25a, . . . .

Figure 31:
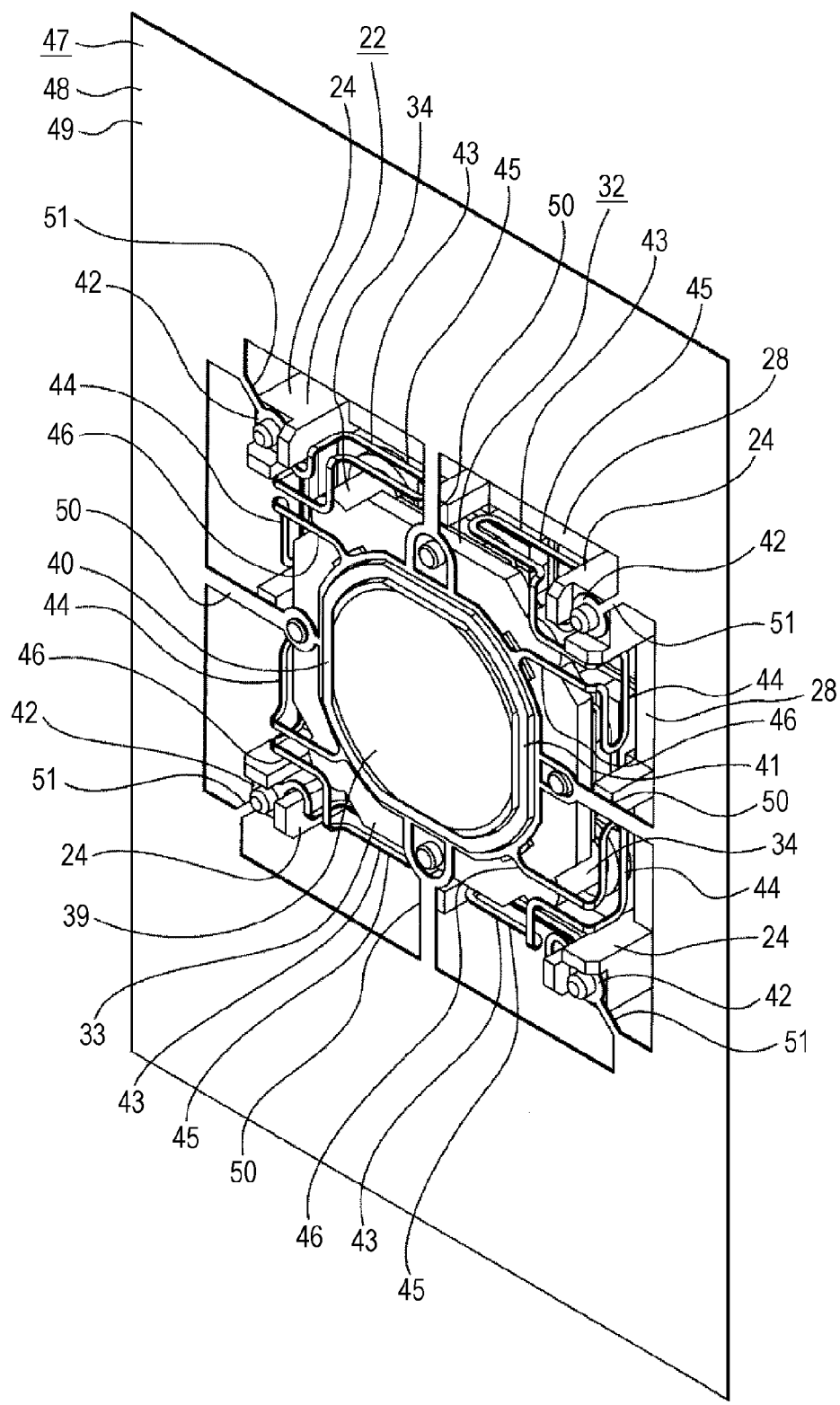
FIG. 31 is an enlarged perspective view showing a state in which the frame member is assembled to the base body.
Figure 32:
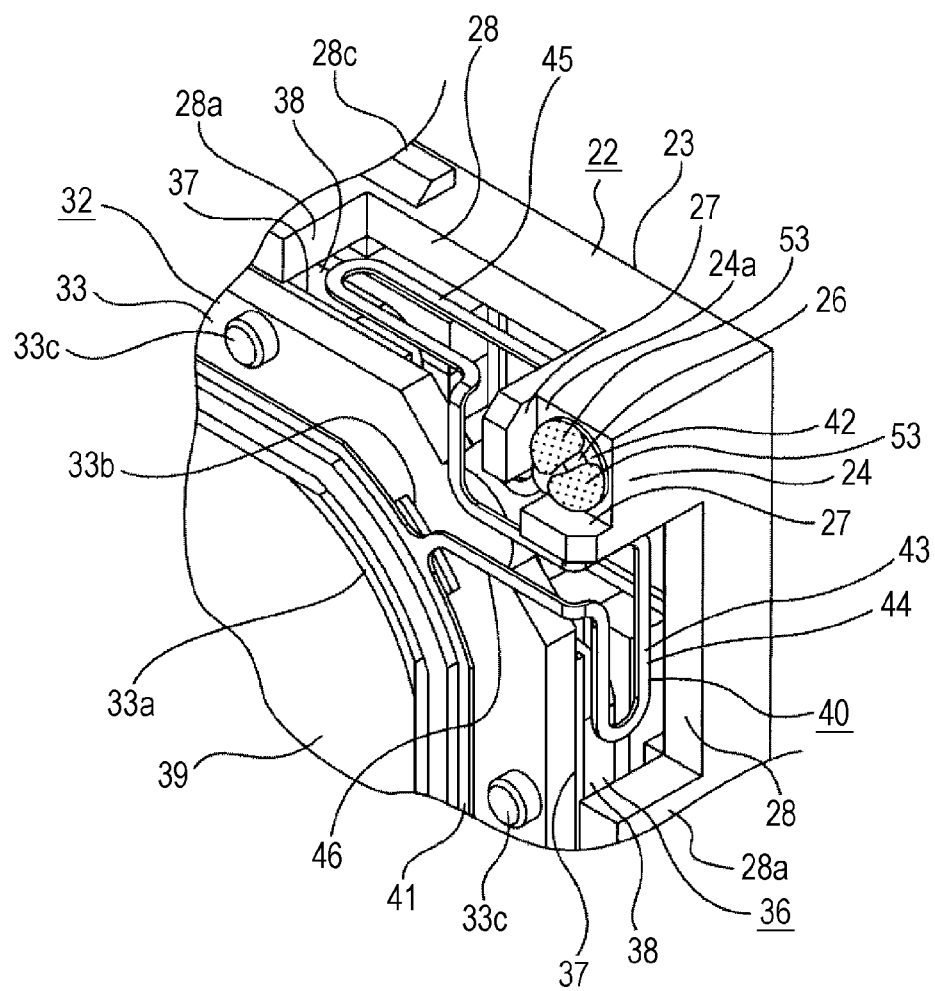
FIG. 32 is an enlarged perspective view showing a part of the base body etc., showing a state in which the frame member is fixed to the base body using an adhesive.
Figure 33:
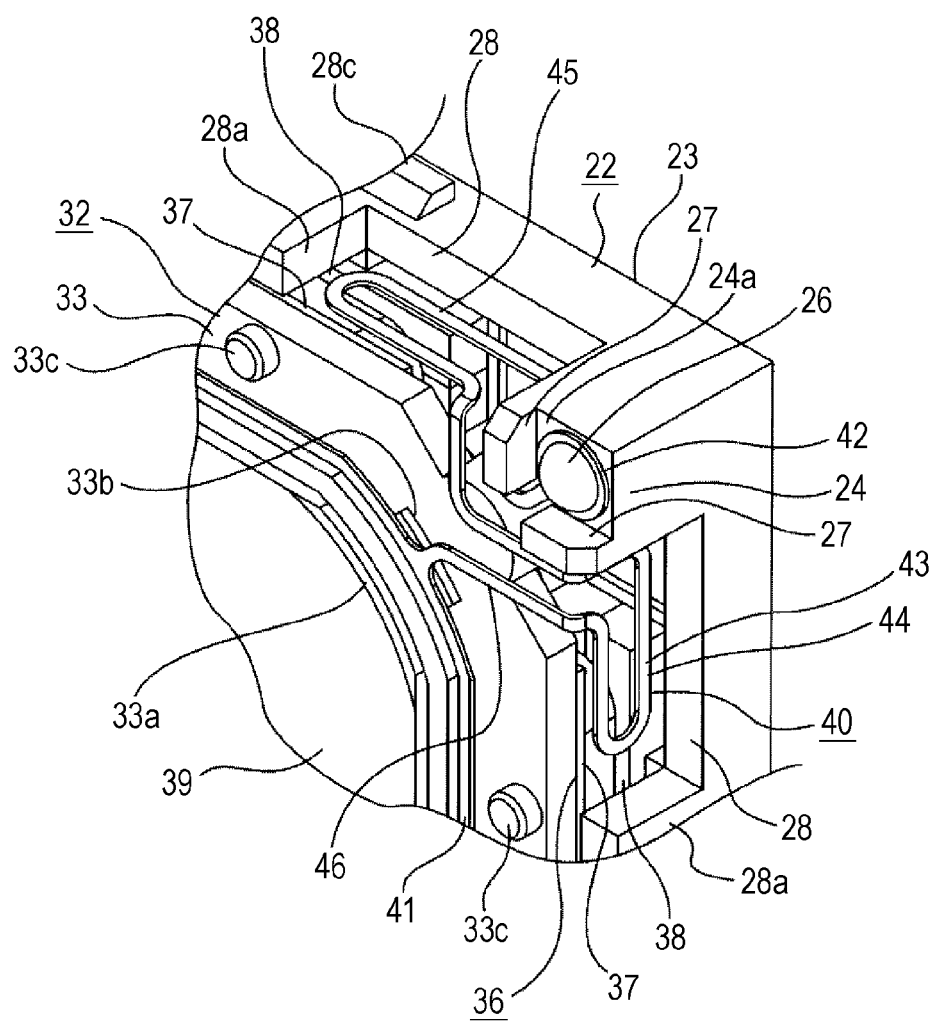
FIG. 33 is an enlarged perspective view showing a part of the base body etc., showing a state in which the frame member is fixed to the base body by seizing.

Subsequently, the ball contact surfaces 34a, 34a, . . . of the positioning projecting portions 34, 34, . . . of the holder 32 to which the frame member 47 is assembled are contacted by the ball members 31, 31, . . . , and the second link portions 42, 42, . . . of the plate spring 40 are fitted with the positioning pins 26, 26, . . . provided on the column portions 24, 24, . . . of the base body 22 (see FIG. 31). The second link portions 42, 42, ... are contacted by the spring reception surfaces 24a, 24a, ... of the column portions 24, 24, ....

Next, the second link portions 42, 42, ... are fixed to the column portions 24, 24, ... by adhesives 53, 53, ... (see FIG. 32). Next, the second link portions 42, 42, ... may be fixed to the column portions 24, 24, ... by seizing with the positioning pins 26, 26, ... swaged (see FIG. 33).

Figure 34:
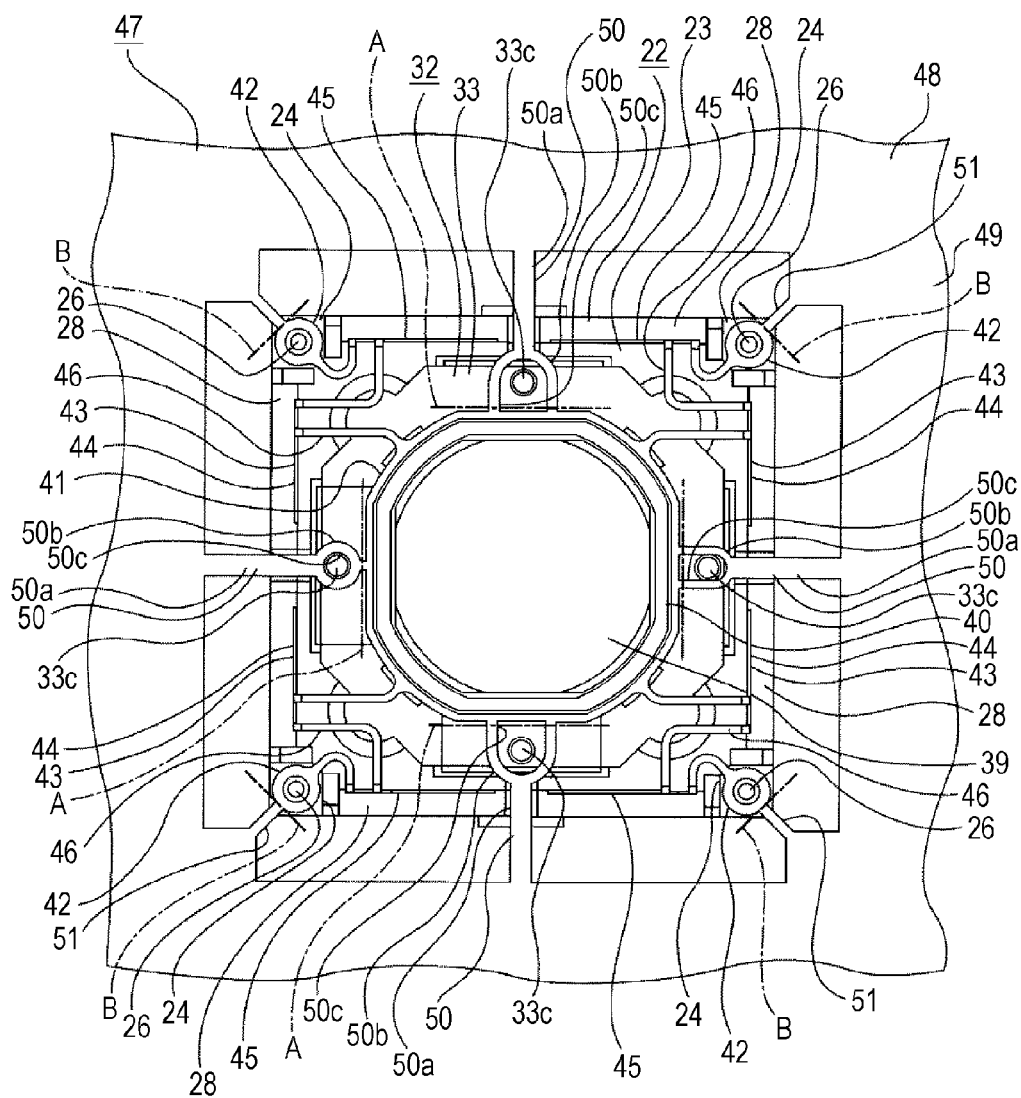
FIG. 34 is an enlarged plan view showing a cut portion of the frame member.
Figure 35:
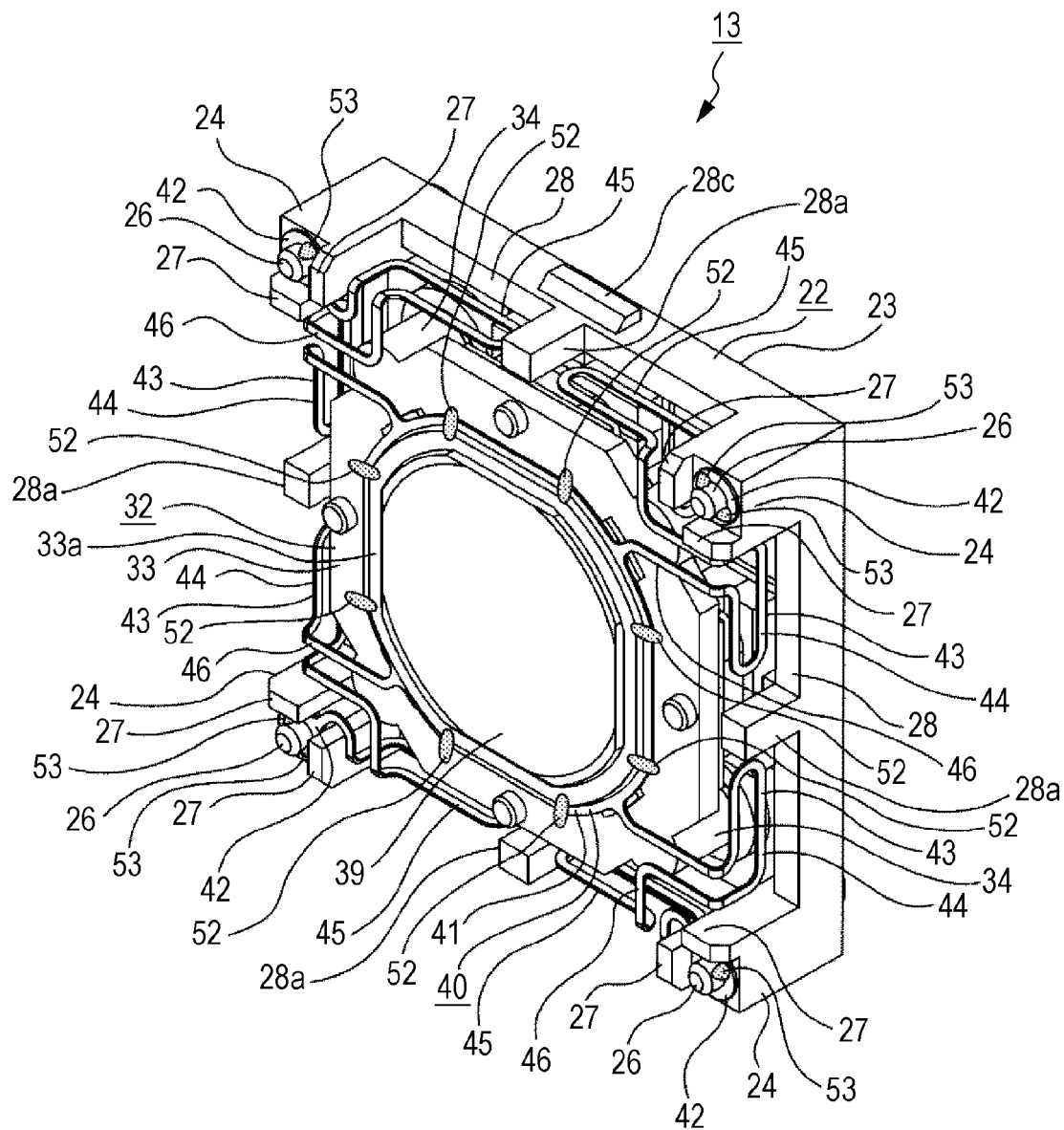
FIG. 35 is an enlarged perspective view showing a state in which the blur correction device is assembled.

Finally, as shown in FIG. 34, portions A, A, ... at which the first link portion 41 and the first coupling piece portions 50, 50, ... are continuous with each other and portions B, B, ... at which the second link portions 42, 42, ... and the second coupling piece portions 51, 51, ... are continuous with each other are cut off by a laser or the like to complete assembly of the blur correction device 13 (see FIG. 35).

By cutting off the frame member 47 at predetermined positions with various portions of the plate spring 40 fixed to the holder 32 and the base body 22 as described above, the plate spring 41 and the spring support frame 48 may be cut off from each other without deforming the plate spring 41.

[Imaging Apparatus According to Embodiment]

Figure 36:
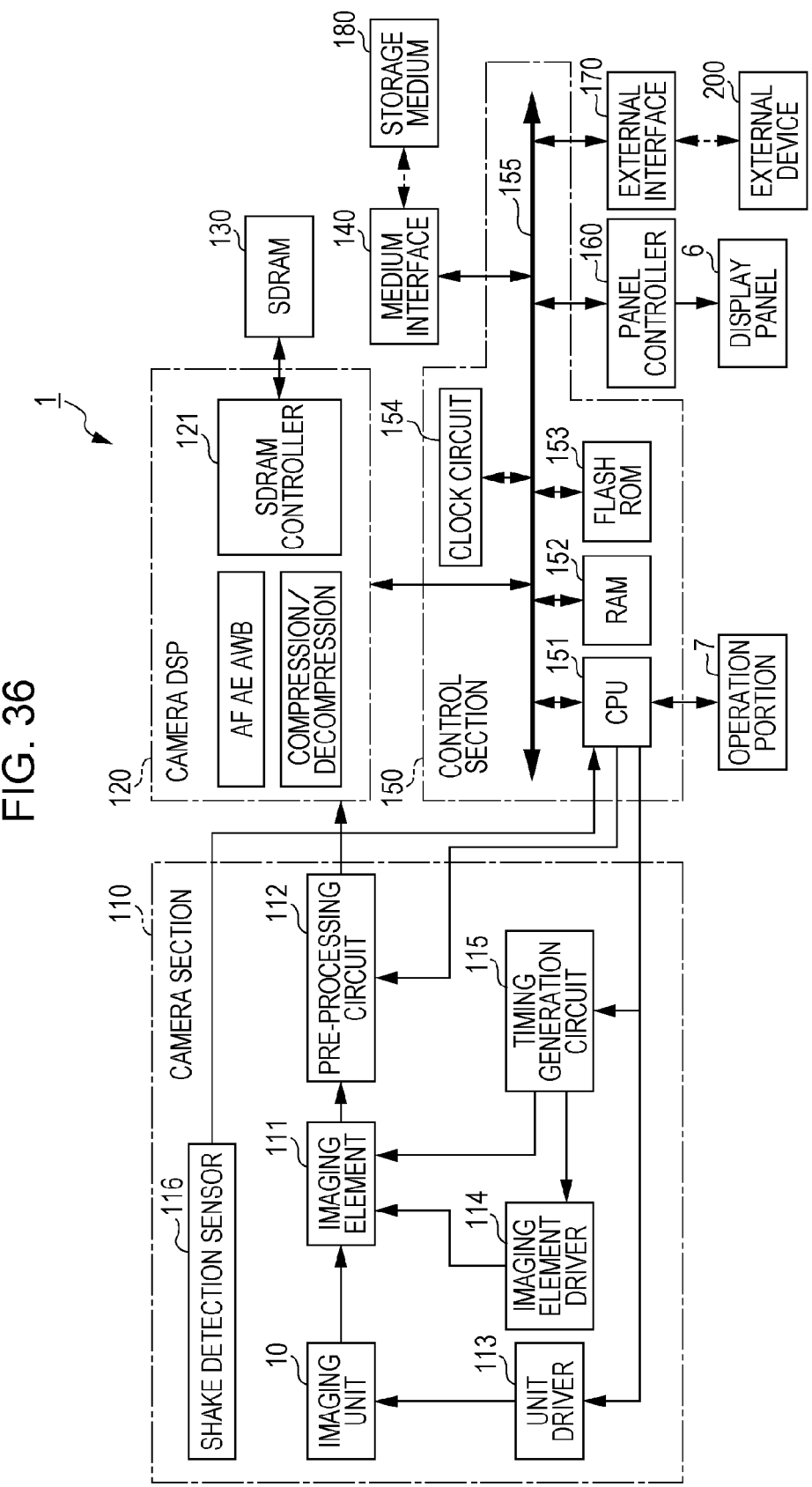
FIG. 36 is a block diagram showing the imaging apparatus according to the embodiment.

The imaging apparatus 1 according to the embodiment will be described below (see FIG. 36).

The imaging apparatus 1 includes a camera section 110, a camera digital signal processor (DSP) 120, a synchronous dynamic random access memory (SDRAM) 130, a medium interface 140, a control section 150, a panel controller 160, the display panels 6, 6, the operation portions 7, 7, ..., and an external interface 170.

A storage medium 180 may be removably mounted to the imaging apparatus 1. A variety of media such as so-called memory cards in which a semiconductor memory is used, optical storage media such as recordable digital versatile disks (DVDs) and recordable compact discs (CDs), and magnetic storage media such as magnetic disks may be used as the storage medium 180.

The camera section 110 includes the imaging unit 10, an imaging element 111 such as a CCD or a CMOS, a pre-processing circuit 112, a unit driver 113, an imaging element driver 114, a timing generation circuit 115, and a shake detection sensor 116.

The camera DSP 120 includes an SDRAM controller 121 that controls the SDRAM 130.

The control section 150 is a microcomputer in which a central processing unit (CPU) 151, a random access memory (RAM) 152, a flash read only memory (ROM) 153, and a clock circuit 154 are connected to each other through a system bus 155, and controls various components of the imaging apparatus 1.

The RAM 152 is mainly used as a work area for temporarily storing the interim results of a process or the like.

The flash ROM 153 stores a variety of programs executed by the CPU 151, data necessary for a process, and so forth.

The clock circuit 154 outputs the current date, the current day of the week, and the current time, and outputs the date and time of image capture as well.

The unit driver 113 generates a drive signal under control by the control section 150, and drives the imaging unit 10 in accordance with the generated signal to capture an image. The imaging unit 10 performs various operations such as focusing, zooming, and blur correction in accordance with the drive signal output from the unit driver 113, and takes an image of a subject and sends the image to the imaging element 111.

The imaging unit 10 controls the blur correction device 13 as follows. Information on the amount of shake detected by the shake detection sensor 116 including an X-axis accelerometer and a Y-axis accelerometer, for example, is output to the control section 150, and the control section 150 calculates the amount of movement of the holder 32 in the X direction and the Y direction on the basis of the output amount of shake. The control section 150 controls the unit driver 113 so as to move the holder 32 on the basis of the calculated amount of movement. Specifically, the holder 32 is moved in the X direction or the Y direction by energizing the drive coils 38, 38, ... of the coil body 36 on the basis of a control signal from the control section 150.

The imaging element 111 has a function of performing a photoelectric conversion on the image taken by the imaging unit 10 to output the resulting image, and is driven in accordance with the drive signal output from the imaging element driver 114. The imaging element 111 sends an electrical signal for the taken image of the subject (image information) to the pre-processing circuit 112 on the basis of a timing signal output from the timing generation circuit 115 controlled by the control section 150.

The timing generation circuit 115 generates a timing signal in accordance with control by the control section 150. The imaging element driver 114 generates a drive signal to be supplied to the imaging element 111 on the basis of the timing signal sent from the timing generation circuit 115.

The pre-processing circuit 112 has a function of performing a correlated double sampling (CDS) process on the image information sent from the imaging element 111 to keep a suitable S/N ratio, and performs an automatic gain control (AGC) process to control a gain. The pre-processing circuit 112 also performs an analog/digital (A/D) conversion to generate image data in the form of a digital signal.

The image data converted into a digital signal by the pre-processing circuit 112 is sent to the camera DSP 120. The camera DSP 120 performs camera signal processes such as auto focus (AF), auto exposure (AE), and auto white balance (AWB) on the image data sent from the pre-processing circuit 112. The image data thus subjected to the variety of adjustments are compressed using a predetermined compression scheme, sent to the storage medium 180 via the system bus 155 and the medium interface 140, and stored in the storage medium 180 as a file.

The image data stored in the storage medium 180 are read via the medium interface 140 in accordance with an operation input by a user using the operation portions 7, 7, ..., and the read image data are sent to the camera DSP 120.

The camera DSP 120 performs a decompression process (expansion process) on the compressed image data read from the storage medium 180 and sent via the medium interface 140, and outputs decompressed image data to the panel controller 160 via the system bus 155.

The panel controller 160 generates an image signal to be output to the display panel 6 on the basis of the image data sent from the camera DSP 120, and sends the generated image signal to the display panel 6 for display. The image display is performed on the basis of a display processing program stored in the flash ROM 153. The display processing program selects the scheme for storage of a file system and the image to be reproduced as discussed later.

The external interface 170 is connected to an external device 200 such as a personal computer. The external interface 170 has a function of storing image data input from the external device 200 in the storage medium 180, and outputting image data stored in the storage medium 180 to the external device 200.

Connecting a communication module to the external interface 170 enables connection to a network such as the Internet, and enables acquiring image data or other information through the network to store the acquired data or information in the storage medium 180. Connecting a communication module to the external interface 170 also enables transmitting data stored in the storage medium 180 through the network.

The external interface 170 may be provided as a wired interface such as Institute of Electrical and Electronics Engineers (IEEE) 1394 or Universal Serial Bus (USB), or as a wireless interface that uses light or radio waves.

[Conclusion]

In the imaging apparatus 1 and the blur correction device 13 provided in the imaging apparatus 1, as has been described above, the plate spring 40 is provided to couple the base body 22 and the holder 32 to each other, and elastically deformed when the holder 32 is moved with respect to the base body 22 in a direction orthogonal to the optical axis direction. The optical element 39 is positioned with respect to the base body 22 with the plate spring 40 urging the holder 32 in the optical axis direction.

Thus, a plurality of members are not interposed between the holder 32 and the base body 22, improving the positional accuracy of the optical element 39 in the optical axis direction in addition to securing a size reduction.

The holder 32 is moved in a direction orthogonal to the optical axis direction with the holder 32 held by the plate spring 40. Thus, a guide shaft or the like, which guides the holder 32, does not have to be provided and accordingly promotes simplification and a size reduction of the mechanism.

Further, the drive magnets 30, 30, . . . and the drive coils 38, 38, . . . are disposed between the base body 22 and the holder 32, rather than provided in front or rear of the plate spring 40, promoting a further size and thickness reduction.

Furthermore, the single plate spring 40 applies urging forces in two directions, namely the optical axis direction and a direction orthogonal to the optical axis direction, to the holder 32, accordingly reducing the number of components.

In addition, the holder 32 is held by the plate spring 40 in a plane orthogonal to the optical axis direction. Therefore, the holder 32 is moved linearly in response to a thrust generated when the drive coils 38, 38, . . . are energized, facilitating operation control of the optical element 39 held by the holder 32.

The plate spring 40 is provided with the first link portion 41, the second link portions 42, 42, . . . , and the deformable portions 43, 43, . . . , and portions of the deformable portions 43, 43, . . . are folded to be oriented in a direction different from the optical axis direction.

This enables adjustment of urging forces for the holder 32, and promotes a size reduction in a direction orthogonal to the optical axis direction.

Further, the outermost portions of the deformable portions 43, 43, . . . are folded to form the first urging portions 44, 44, . . . and the second urging portions 45, 45, . . . , promoting a further size reduction in a direction orthogonal to the optical axis direction.

Furthermore, the first urging portions 44, 44, . . . and the second urging portions 45, 45, . . . are folded by an angle of 90° with respect to other portions.

This allows the first urging portions 44, 44, . . . and the second urging portions 45, 45, . . . , to efficiently apply urging forces to the holder 32, and promotes a size reduction in a direction orthogonal to the optical axis direction.

The first link portion 41 is formed in the shape of an annulus oriented in the optical axis direction, and a plurality of deformable portions 43, 43, . . . are provided in a spaced manner in the circumferential direction of the first link portion 41 to project outward from the first link portion 41.

Therefore, appropriate urging forces in the optical axis direction may be applied to the holder 32.

Further, the plurality of deformable portions 43, 43, . . . are provided at point-symmetric positions about the optical axis. This allows the optical element 39 to be held stably with respect to the base body 22, and allows the optical element 39 to be moved in a direction orthogonal to the optical axis direction in a well-balanced manner during a blur correction operation.

Furthermore, the deformable portions 43, 43, . . . are provided at equal intervals in the circumferential direction of the first link portion 41. This allows the optical element 39 to be moved in the optical axis direction and a direction orthogonal to the optical axis direction in a well-balanced manner in addition to securing appropriate urging forces applied to the holder 32.

The deformable portion 43 is provided with the first urging portion 44 and the second urging portion 45. This allows appropriate urging forces to be applied to the holder 32 in addition to promoting simplification of the structure of the plate spring 40.

Further, the first urging portion 44 is shaped to include the first straight portion 44*a* and the second straight portion 44*b* positioned in parallel with each other. This allows appropriate urging forces in a direction orthogonal to the optical axis direction to be applied to the holder 32 in addition to securing a size reduction by reducing the space for arrangement of the first urging portion 44.

Furthermore, the second urging portion 45 is shaped to include the first straight portion 45*a* and the second straight portion 45*b* positioned in parallel with each other. This allows appropriate urging forces in a direction orthogonal to the optical axis direction to be applied to the holder 32 in addition to securing a size reduction by reducing the space for arrangement of the second urging portion 45.

The third urging portion 46 is shaped to include the first straight portion 46*a* and the second straight portion 46*b* positioned in parallel with each other, and to include the third straight portion 46*c* and the fourth straight portion 46*d* positioned in parallel with each other. This allows appropriate urging forces in the optical axis direction to be applied to the holder 32 in addition to securing a size reduction by reducing the space for arrangement of the third urging portion 46.

Further, the third urging portions 46, 46, . . . are provided between the first link portion 41 and the first urging portion 44, between the first urging portion 44 and the second urging portion 45, and between the second urging portion 45 and the second link portion 42.

The third urging portions 46, 46, . . . are thus provided separately, allowing appropriate urging forces in the optical axis direction to be applied to the holder 32 in addition to securing a size reduction of the plate spring 40 by reducing the space for arrangement of the third urging portions 46, 46, . . . .

[Other Configurations]

In the example described above, the yoke 29 and the drive magnets 30, 30, . . . are fixed to the base body 22, and the coil body 36 including the drive coils 38, 38, . . . is fixed to the holder 32. Conversely, the coil body 36 including the drive coils 38, 38, . . . may be fixed to the base body 22, and the yoke 29 and the drive magnets 30, 30, . . . may be fixed to the holder 32.

Because the total weight of the yoke 29 and the drive magnets 30, 30, . . . is larger than the weight of the coil body 36, however, fixing the yoke 29 and the drive magnets 30, 30, . . . to the base body 22 and fixing the coil body 36 to the holder 32 may secure a smoother operation of the holder 32.

[Present Technology]

The present technology may be configured as follows.

(1) A blur correction device including a base body, a holder that holds an optical element, a drive section that moves the holder with respect to the base body in two directions that are orthogonal to a direction of an optical axis of the optical element and that are orthogonal to each other, and a plate spring that couples the base body and the holder to each other and that urges the holder in the optical axis direction to position the optical element with respect to the base body, the plate spring being elastically deformed when the holder is moved with respect to the base body in the two directions.

(2) The blur correction device according to (1) above, in which the plate spring includes a first link portion linked to the holder, a second link portion linked to the base body, and a deformable portion that is positioned between the first link portion and the second link portion and that is elastically deformable, and at least a portion of the deformable portion is folded to be oriented in a direction different from the optical axis direction.

(3) The blur correction device according to (2) above, in which an outermost portion of the deformable portion is folded.

(4) The blur correction device according to (2) or (3) above, in which a portion of the deformable portion is folded to be oriented in a direction orthogonal to the optical axis direction.

(5) The blur correction device according to any one of (1) to (4) above, in which the first link portion is formed in a shape of an annulus oriented in the optical axis direction, and a plurality of the deformable portions are provided in a spaced manner in a circumferential direction of the first link portion to project outward from the first link portion.

(6) The blur correction device according to (5) above, in which the plurality of deformable portions are provided at point-symmetric positions about the optical axis.

(7) The blur correction device according to (6) above, in which the deformable portions are provided at equal intervals.

(8) The blur correction device according to any one of (2) to (7) above, in which the deformable portion includes a first urging portion that applies an urging force in a third direction to the holder when the holder is moved in a first direction orthogonal to the optical axis direction, and a second urging portion that applies an urging force in a fourth direction to the holder when the holder is moved in a second direction that is orthogonal to the optical axis direction and that is orthogonal to the first direction, the third direction being opposite the first direction, and the fourth direction being opposite the second direction.

(9) The blur correction device according to (8) above, in which the first urging portion is shaped to include a pair of straight portions positioned in parallel with each other.

(10) The blur correction device according to (8) or (9) above, in which the second urging portion is shaped to include a pair of straight portions positioned in parallel with each other.

(11) The blur correction device according to any one of (8) to (10) above, in which the deformable portion includes a third urging portion that urges the holder in a direction of bringing the holder closer to the base body in the optical axis direction, and the third urging portion is shaped to include at least a pair of straight portions positioned in parallel with each other.

(12) The blur correction device according to (11) above, in which the third urging portions are provided separately between the first link portion and the first urging portion, between the first urging portion and the second urging portion, and between the second urging portion and the second link portion.

(13) The blur correction device according to any one of (1) to (12) above, further including a drive coil attached to one of the base body and the holder, and a drive magnet attached to the other of the base body and the holder and positioned opposite the drive coil, in which the drive coil and the drive magnet serve as the drive section.

(14) The blur correction device according to (13) above, in which two pairs of the drive coils and two pairs of the drive magnets are disposed opposite each other across the optical axis and at the same distance from the optical axis.

(15) The blur correction device according to any one of (1) to (14) above, in which ball members are disposed between the base body and the holder so as to be rollable with respect to the base body and the holder, and the holder is pressed against the ball members by the plate spring.

(16) An imaging apparatus including a blur correction device that moves an optical element in a direction orthogonal to a direction of an optical axis of the optical element to correct blur, the blur correction device including a base body, a holder that holds the optical element, a drive section that moves the holder with respect to the base body in two directions that are orthogonal to the optical axis direction and that are orthogonal to each other, and a plate spring that couples the base body and the holder to each other and that urges the holder in the optical axis direction to position the optical element with respect to the base body, the plate spring being elastically deformed when the holder is moved with respect to the base body in the two directions.

Specific shapes and structures of respective components described in the embodiment described above are merely illustrative of an exemplary implementation of the present technology, and should not be construed as limiting the technical scope of the present technology.

The present disclosure contains subject matter related to that disclosed in Japanese Priority Patent Application JP 2011-221690 filed in the Japan Patent Office on Oct. 6, 2011, the entire contents of which are hereby incorporated by reference.

What is claimed is:

1. A blur correction device comprising:
a base body;
a holder that holds an optical element and is movably associated with the base body along an optical axis defining an optical axis direction, a x-axis defining a x-axis direction and a y-axis defining a y-axis direction, the optical axis, the x-axis and the y-axis perpendicularly intersecting one another at a common reference point;
a drive section that moves the holder with respect to the base body in the x-axis and y-axis directions and relative to the common reference point; and
a plate spring having an elastically-deformable first urging portion, an elastically-deformable second urging portion and an elastically-deformable third urging portion serially connected together as an integral construction, the plate spring disposed between and coupling the holder and the base body together,
wherein, the elastically-deformable first urging portion urges the holder in the x-axis direction towards the common reference point when the drive section moves the holder relative to the base body in the x-axis direction, the elastically-deformable second urging portion urges the holder relative to the base body in the y-axis direction towards the common reference point when the drive section moves the holder relative to the base body in the y-axis direction and the elastically-deformable third urging portion urges the holder and the base body together along the optical axis when the holder and base body move apart from one another in the optical axis direction.

2. A blur correction device comprising:
a base body;
a holder that holds an optical element;
a drive section that moves the holder with respect to the base body in two directions that are orthogonal to a direction of an optical axis of the optical element and that are orthogonal to each other; and
a plate spring that couples the base body and the holder to each other and that urges the holder in the optical axis direction to position the optical element with respect to the base body, the plate spring being elastically deformed when the holder is moved with respect to the base body in the two directions,
wherein the plate spring includes a first link portion linked to the holder, a second link portion linked to the base body, and a deformable portion that is positioned between the first link portion and the second link portion and that is elastically deformable, and
a portion of the deformable portion is folded to be oriented in a direction different from the optical axis direction.

3. The blur correction device according to claim 2,
wherein an outermost portion of the deformable portion is folded.

4. The blur correction device according to claim 2,
wherein a portion of the deformable portion is folded to be oriented in a direction orthogonal to the optical axis direction.

5. The blur correction device according to claim 2,
wherein the first link portion is formed in a shape of an annulus oriented in the optical axis direction, and
a plurality of the deformable portions are provided in a spaced manner in a circumferential direction of the first link portion to project outward from the first link portion.

6. The blur correction device according to claim 5,
wherein the plurality of deformable portions are provided at point-symmetric positions about the optical axis.

7. The blur correction device according to claim 6,
wherein the deformable portions are provided at equal intervals.

8. The blur correction device according to claim 2,
wherein the deformable portion includes a first urging portion that applies an urging force in a third direction to the holder when the holder is moved in a first direction orthogonal to the optical axis direction, and a second urging portion that applies an urging force in a fourth direction to the holder when the holder is moved in a second direction that is orthogonal to the optical axis direction and that is orthogonal to the first direction, the third direction being opposite the first direction, and the fourth direction being opposite the second direction.

9. The blur correction device according to claim 8,
wherein the first urging portion is shaped to include a pair of straight portions positioned in parallel with each other.

10. The blur correction device according to claim 8,
wherein the second urging portion is shaped to include a pair of straight portions positioned in parallel with each other.

11. The blur correction device according to claim 8,
wherein the deformable portion includes a third urging portion that urges the holder in a direction of bringing the holder closer to the base body in the optical axis direction, and
the third urging portion is shaped to include at least a pair of straight portions positioned in parallel with each other.

12. The blur correction device according to claim 11,
wherein the third urging portions are provided separately between the first link portion and the first urging portion, between the first urging portion and the second urging portion, and between the second urging portion and the second link portion.

13. The blur correction device according to claim 2, further comprising:
a drive coil attached to one of the base body and the holder; and
a drive magnet attached to the other of the base body and the holder and positioned opposite the drive coil,
wherein the drive coil and the drive magnet serve as the drive section.

14. The blur correction device according to claim 13,
wherein two pairs of the drive coils and two pairs of the drive magnets are disposed opposite each other across the optical axis and at the same distance from the optical axis.

15. The blur correction device according to claim 2,
wherein ball members are disposed between the base body and the holder so as to be rollable with respect to the base body and the holder, and
the holder is pressed against the ball members by the plate spring.

16. An imaging apparatus comprising
a blur correction device that moves an optical element in a direction orthogonal to a direction of an optical axis of the optical element to correct blur, the blur correction device including:
a base body;
a holder that holds the optical element;
a drive section that moves the holder with respect to the base body in two directions that are orthogonal to the optical axis direction and that are orthogonal to each other; and
a plate spring that couples the base body and the holder to each other and that urges the holder in the optical axis direction to position the optical element with respect to the base body, the plate spring being elastically deformed when the holder is moved with respect to the base body in the two directions,
wherein the plate spring includes a first link portion linked to the holder, a second link portion linked to the base body, and a deformable portion that is positioned between the first link portion and the second link portion and that is elastically deformable, and
a portion of the deformable portion is folded to be oriented in a direction different from the optical axis direction.

* * * * *